US012592143B2

(12) United States Patent (10) Patent No.: US 12,592,143 B2
Sundaram et al. (45) Date of Patent: Mar. 31, 2026

(54) SYSTEM AND DEVICE FOR THREAT MONITORING

(71) Applicant: Schon Mobility Inc., Bloomfield Hills, MI (US)

(72) Inventors: Vishnu Gurusamy Sundaram, Bloomfield, MI (US); Krishna Swetha Meka, Bloomfield Hills, MI (US)

(73) Assignee: Schon Mobility Inc., Bloomfield Hills, MI (US)

( * ) Notice: Subject to any disclaimer, the term of this patent is extended or adjusted under 35 U.S.C. 154(b) by 170 days.

(21) Appl. No.: 18/516,866

(22) Filed: Nov. 21, 2023

(65) Prior Publication Data

US 2025/0166482 A1     May 22, 2025

(51) Int. Cl.
| *G08B 21/18* | (2006.01) |
| *G01S 13/89* | (2006.01) |
| *G02B 27/01* | (2006.01) |
| *G06F 3/01* | (2006.01) |
| *G06T 7/50* | (2017.01) |
| *G06T 19/00* | (2011.01) |
| *G08B 3/00* | (2006.01) |
| *G08B 5/00* | (2006.01) |
(Continued)

(52) U.S. Cl.
CPC ............ *G08B 21/182* (2013.01); *G01S 13/89* (2013.01); *G02B 27/017* (2013.01); *G06F 3/011* (2013.01); *G06T 7/50* (2017.01); *G06T 19/006* (2013.01); *G08B 3/00* (2013.01); *G08B 5/00* (2013.01); *G08B 6/00* (2013.01); *H04L 67/306* (2013.01); *H04W 4/40* (2018.02)

(58) Field of Classification Search
CPC .......... G08B 21/182; G08B 3/00; G08B 5/00;
G08B 6/00; G06T 7/50; G06T 19/006;
H04W 4/40; G01S 13/89; G02B 27/017;
G06F 3/011; H04L 67/306
USPC ......................................................... 340/540
See application file for complete search history.

(56) References Cited

U.S. PATENT DOCUMENTS

| 10,091,465 | B2 * | 10/2018 | Dellantoni | ......... | G01C 21/3602 |
| 11,417,106 | B1 * | 8/2022 | Alzahrani | ................. | G06T 7/20 |
(Continued)

FOREIGN PATENT DOCUMENTS

CN     112335972     *     2/2021

*Primary Examiner* — Brian A Zimmerman
*Assistant Examiner* — Thang D Tran
(74) *Attorney, Agent, or Firm* — ROCKLAW PLLC

(57)     ABSTRACT

A threat monitoring system for a head-mounted wearable device is disclosed. The system includes a controller, an Internet of Things (IoT) cloud server with an IoT database generating virtual data feeds, and a plurality of physical sensors configured to sense and generate visual and radar feeds. An environment monitoring unit receives and integrates data from the sensors and virtual data feeds to generate a real-time, multi-dimensional map of the environment. An awareness unit analyzes the user's position and context to identify threat indicators. The controller analyzes user profile data, sensor feeds, environmental context, and virtual data to predict threats. Warnings are delivered to the user via a multimodal communication interface, providing directional and intensity cues through audio, visual, or haptic modalities, adaptively tailored to the user's context. The system enables proactive safety alerts for users in various activities, enhancing protection against visible and invisible threats.

25 Claims, 9 Drawing Sheets

(51) Int. Cl.
    *G08B 6/00*        (2006.01)
    *H04L 67/306*    (2022.01)
    *H04W 4/40*     (2018.01)

(56) References Cited

U.S. PATENT DOCUMENTS

| | | | | |
|---|---|---|---|---|
| 2016/0301746 A1* | 10/2016 | Bauer | | G06F 9/5072 |
| 2017/0178668 A1* | 6/2017 | Kar | | G10L 25/78 |
| 2017/0213390 A1* | 7/2017 | Ramachandran | ... | G06F 3/03547 |
| 2017/0309152 A1* | 10/2017 | Dinkins | | G08B 21/043 |
| 2019/0362147 A1* | 11/2019 | Adam | | G06N 5/048 |
| 2019/0379861 A1* | 12/2019 | Clark | | G06T 7/593 |
| 2020/0080858 A1* | 3/2020 | Werner | | G01C 21/3484 |
| 2020/0293394 A1* | 9/2020 | Abhinav | | G06T 7/0004 |
| 2020/0294092 A1* | 9/2020 | Tong | | G06V 20/59 |
| 2020/0297063 A1* | 9/2020 | Andon | | G06F 1/163 |
| 2020/0363824 A1* | 11/2020 | Levin | | H04W 4/021 |
| 2020/0368616 A1* | 11/2020 | Delamont | | H04N 13/239 |
| 2021/0192241 A1* | 6/2021 | Zhu | | H04N 23/661 |
| 2021/0195981 A1* | 7/2021 | Ghaffarzadegan | | B60W 50/0098 |
| 2022/0237816 A1* | 7/2022 | Jiang | | G06T 7/70 |
| 2023/0040552 A1* | 2/2023 | Lee | | B60W 50/0098 |
| 2023/0102579 A1* | 3/2023 | Liu | | B60W 50/14 |
| | | | | 340/425.5 |
| 2023/0221794 A1* | 7/2023 | Nakamichi | | G02B 27/0093 |
| | | | | 345/156 |
| 2023/0334788 A1* | 10/2023 | Zohni | | G06F 3/012 |
| 2024/0185717 A1* | 6/2024 | Wendt | | B62J 11/04 |
| 2024/0227835 A1* | 7/2024 | Naserian | | G06V 20/56 |
| 2024/0430655 A1* | 12/2024 | Pateromichelakis | .. | G08G 1/163 |
| 2025/0069509 A1* | 2/2025 | Mollenhauer | | G08G 1/0955 |

* cited by examiner

240

258

250

256                                    256

SYSTEM AND DEVICE FOR THREAT MONITORING

FIELD OF THE PRESENT DISCLOSURE

The present disclosure generally relates to safety accessories such as helmets, and more particularly to a system and a device for active threat monitoring in a user worn helmet and for proactively warning the user about threats in both visible and invisible range.

BACKGROUND

Safety accessories such as helmets and other protective headgear have evolved over the years. Helmets have the primary function of protecting the head of a person from an injury that may be sustained while engaged in work, sports and other activities. Presently, the helmets are one of the most common safety gears that is worn by cyclists, sport professionals, race car drivers, go-cart drivers, snowmobile drivers, commuters, and others to protect them from any injuries that could arise out of an accident such as collision or a fall or an attack. It is not uncommon for individuals to wear protective headgear when they are, for example, riding bicycles, riding horses, roller-blading, playing football, playing baseball, playing hockey, skiing and skating, as well as for other general safety purposes.

These protective helmets are great at protecting heads from sustaining the full impact in a collision. However, the helmets may impede the wearer's ability to see (and perhaps even fully hear) potential danger approaching, particularly from behind.

In some solution, the helmet manufactures realize protective helmets can incorporate other safety features such as two-way and AM/FM radios, turn signals, rear view mirrors and other safety devices. Protective helmets with two-way communication systems are generally well known. Some of these well-known systems carry a transmitting unit within the helmet. Such a unit is not a complete and self-contained system. Other known units have an external antenna, are not protected from shock, and provide earphones which may completely cover the ear. In other solutions, by integrating safety monitoring features (integrating navigation and communications into the helmet), the helmet provides an extra level of security in case of emergency.

Most solutions in the market today are reactive in nature. However, the helmets described in the art are passive in nature and fail to be responsive to the user's environment, and also fails to warn the users about threats which are in both visible range and invisible range.

The present disclosure has been made in view of such considerations, and it is an object of the present disclosure to provide systems and devices for active threat monitoring in a user worn helmet that provides a high degree of safety for all of these users bring the need to create a head worn product that can actively protect and help avoid collision or fall or attack or minimize the impact and protect vital parts by combining passive safety of injury protection and proactively warns the users about threats in both visible range and invisible range.

SUMMARY

In an aspect, a threat monitoring system is disclosed. The threat monitoring system comprises a controller and an Internet of Things (IoT) cloud server. The IoT cloud server includes an IoT database wherein the IoT database is configured to generate virtual data feed. The system further comprises a head mounted wearable device. The head mounted wearable device comprises a plurality of physical sensors. The plurality of physical sensors is configured to sense and generate at least one of visual feed and radar feed. The head mounted wearable device further comprises a multimodal communication interface. The system further comprises a user database. The user database is configured to store user profile data. The system further comprises an environment monitoring unit. The environment monitoring unit is configured to map an environment based on at least of one of the visual feed, the radar feed, and the virtual data feed. The system further comprises an awareness unit. The awareness unit is configured to generate an environmental context based on position of a user. The controller is configured to receive the user profile data from the user database, the visual feed and the radar feed from the plurality of physical sensors, the mapped environment from the environment monitoring unit, the environment context from the awareness unit, and the virtual data feed from the IoT database. The controller is further configured to analyse the user profile data, the visual feed and the radar feed, the environment context, and the virtual data feed to predict occurrence of threat. The controller is further configured to warn the user about a threat based on the predicted occurrence of the threat via the multimodal communication interface.

In one or more embodiment, the controller, the user database, the environment monitoring unit, and the awareness unit are disposed in the head mounted wearable device.

In another embodiment, the controller, the user database, the environment monitoring unit, the awareness unit, and the multimodal communication interface are operationally configured in a user device.

In one or more embodiments, the plurality of physical sensors comprises at least one of a front camera, a rear camera, side cameras, an aerial camera, a 360° view camera, and a radar.

In one or more embodiments, the front camera is mounted in the head mounted wearable device facing towards the user for monitoring awareness, attention, and glanced based information of the user.

In one or more embodiments, the 360° view camera is configured to capture images for performing depth detection and for sending the captured images to the IoT cloud server.

In one or more embodiments, the virtual data feed at the IoT server is received from IoT devices.

In one or more embodiments, the virtual data feed comprises cloud-based data, wherein the cloud-based data comprises at least one of weather data, historical data, data on amount of light falling on the user's eyes, SOS alert information, environmental data, and data received from other users.

In one or more embodiments, the virtual data feed comprises peer to peer communication data, wherein the peer to peer communication data comprises vehicle to everything (V2X) data received from peer devices.

In one or more embodiments, the controller is further configured to process the threat based on the analysed data and transmits the processed threat data over V2X (vehicle to everything) communication to the peer devices.

In one or more embodiments, the multimodal communication interface is configured to receive multimodal states related to the user for intent detection thereof.

In one or more embodiments, the multimodal states comprise at least one of user's speech, gesture, touch, brainwave, gaze, pupil movement, head movement and body movement.

In one or more embodiments, the multimodal communication interface warns the user with directionality and intensity of the warning via multimodal communication.

In one or more embodiments, the multimodal communication comprises at least one of bone conduction communication, visual and audible communication, augmented reality projection, virtual reality projection, and stationary display.

In one or more embodiments, the controller is further configured to determine a threshold level for warning the user, wherein the user is warned if the predicted occurrence of the threat is greater than the determined threshold level.

In another aspect, a head mounted wearable device in communication with an Internet of Things (IoT) cloud server for threat monitoring is disclosed. The IoT cloud server includes an IoT database. The IoT database is configured to generate virtual data feed. The device comprises a plurality of physical sensors. The plurality of physical sensors is configured to sense and generate at least one of visual feed and radar feed. The device further comprises a user database. The user database is configured to store user profile data. The device further comprises an environment monitoring unit. The environment monitoring unit is configured to map an environment based on at least of one of the visual feed, the radar feed, and the virtual data feed. The device further comprises an awareness unit. The awareness unit is configured to generate an environmental context based on position of a user. The device further comprises a multimodal communication interface. The device further comprises a controller. The controller is configured to receive the user profile data from the user database, the visual feed and the radar feed from the plurality of physical sensors, the mapped environment from the environment monitoring unit, the environment context from the awareness unit, and the virtual data feed from the IoT database. The controller is further configured to analyse the user profile data, the visual feed and the radar feed, the environment context, and the virtual data feed to predict occurrence of threat. The controller is further configured to warn the user about a threat based on the predicted occurrence of the threat via the multimodal communication interface.

In one or more embodiments, the physical sensors comprise at least one of a front camera, a rear camera, side cameras, an aerial camera, a 360° view camera, and a radar.

In one or more embodiments, the virtual data feed at the IoT server is received from IoT devices.

In one or more embodiments, the virtual data feed comprises cloud-based data, wherein the cloud-based data comprises at least one of weather data, historical data, data on amount of light falling on the user's eyes, SOS alert information, environmental data, and data received from other users.

In one or more embodiments, the virtual data feed comprises peer to peer communication data, wherein the peer to peer communication data comprises vehicle to everything (V2X) data received from peer devices.

In one or more embodiments, the controller is further configured to process the threat based on the analysed data and transmits the processed threat data over V2X (vehicle to everything) communication to the peer devices.

In one or more embodiments, the multimodal communication interface is configured to receive multimodal states related to the user for intent detection thereof.

In one or more embodiments, the multimodal communication interface warns the user with directionality and intensity of the warning via multimodal communication.

In one or more embodiments, the multimodal communication comprises at least one of bone conduction communication, visual and audible communication, augmented reality projection, virtual reality projection, and stationary display.

In one or more embodiments, the device is used by at least one of a biker, a mining worker, a road worker, and a sportsperson.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which.

DETAILED DESCRIPTION

Figure 1:
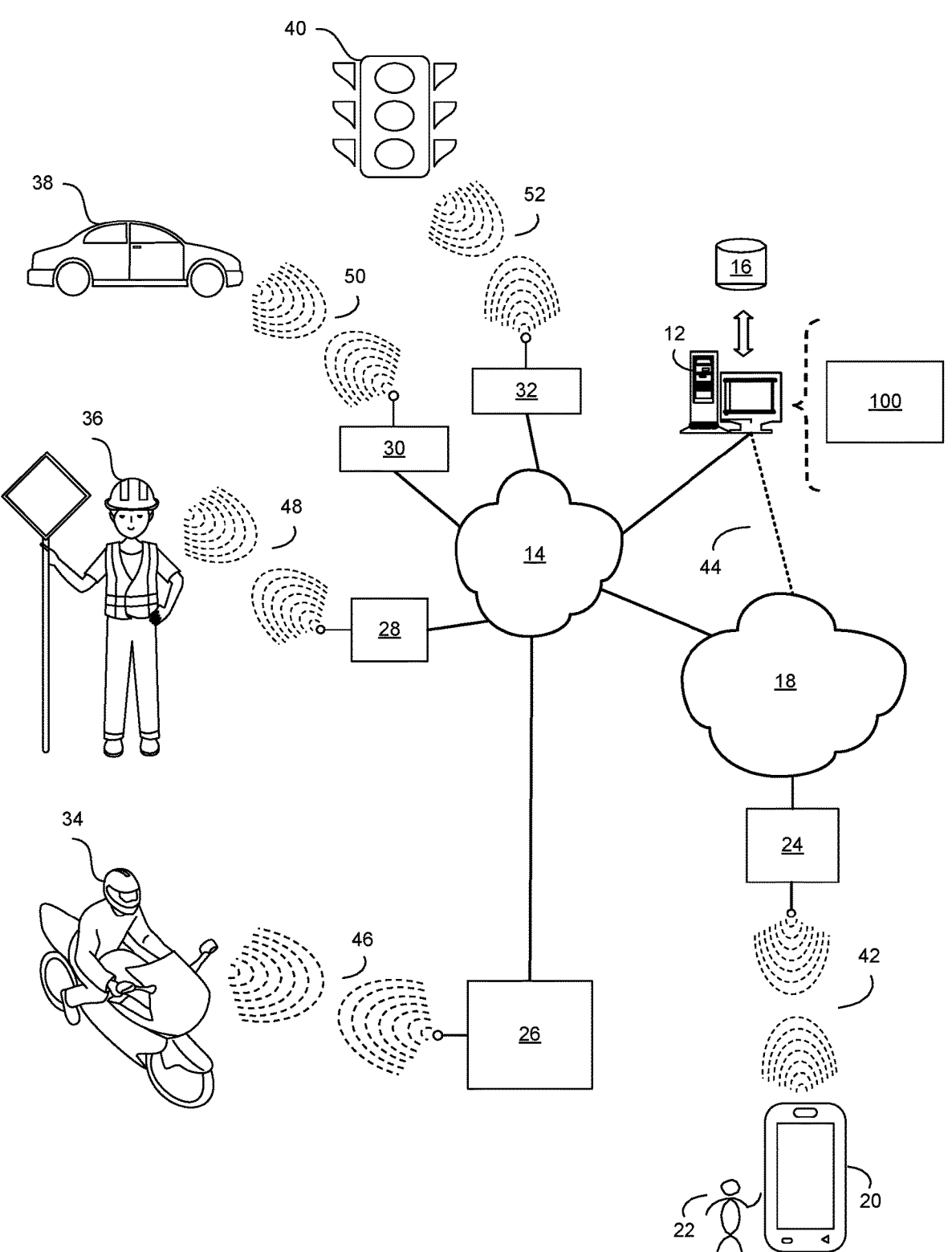
FIG. 1 illustrates a system that may reside on and may be executed by a computer, which may be connected to a network, in accordance with one or more exemplary embodiments of the present disclosure.

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Some portions of the detailed description that follows are presented and discussed in terms of a process or method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fibre cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. In present implementations, the used language for training may be one of Python, Tensorflow™. Bazel, C, C++. Further, decoder in user device (as will be discussed) may use C, C++ or any processor specific ISA. Furthermore, assembly code inside C/C++ may be utilized for specific operation. Also, ASR (automatic speech recognition) and G2P decoder along with entire user system can be run in embedded Linux (any distribution), Android, IOS, Windows, or the like, without any limitations. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function (s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown a system 100 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, a portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, the instruction sets and subroutines of system 100. which may be stored on storage device, such as storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other array); a random-access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used.

In some implementations, user device 20 may include, but are not limited to, a personal computer, a laptop computer, a smart/data-enabled, cellular phone, a notebook computer, a tablet, a server, a television, a smart television, a media (e.g., video, photo, etc.) capturing device, and a dedicated network device. User device 20 may each execute an operating system, examples of which may include but are not limited to, Android®, Apple® IOS®, Mac® OS X®; Red Hat® Linux®, or a custom operating system. In some implementations, user device 20 may be installed with an application (App).

In some implementations, user 22 may access computer 12 and system 100 (e.g., using user device 20) directly through network 14 or through secondary network 18. Further, computer 12 may be connected to network 14 through secondary network 18, as illustrated with phantom link line 44. System 100 may include one or more user interfaces, such as browsers and textual or graphical user interfaces, through which user 22 may access system 100. Herein, user may be cyclists, bike sports professional, race car drivers, go-cart drivers, snowmobile drivers, commuters, and others.

In some implementations, the various user devices may be directly or indirectly coupled to communication network, such as communication network 14 and communication network 18, hereinafter simply referred to as network 14 and network 18, respectively. User device 20 is shown wirelessly coupled to network 18 via wireless communication channel 42 established between user device 20 and cellular network/bridge 24, which is shown directly coupled to network 18.

In some implementations, helmet 34 is provided for protection of the head of biker. Helmet 34 may be connected with computer 12 and system 100 directly through network 14 or through secondary network 18. Helmet 34 is shown wirelessly coupled to network 14 via wireless communication channel 46 established between helmet 34 and wireless access point (i.e., WAP) 26, which is shown directly coupled to network 14. WAP 26 may be, for example, an IEEE 802.11a. 802.11b, 802.11g, Wi-Fi®, RFID, and/or Bluetooth™ (including Bluetooth™ Low Energy) device that is capable of establishing wireless communication channel 46 between helmet 34 and WAP 26. By using this arrangement, multiple bikers can get connected with computer 12 and system 100. Herein, helmet 34 is equipped with multiple sensors (not shown) and cameras (not shown). The sensors and cameras are involved for capturing data such as surrounding environment data, occurrence of the emergency situation ahead, accident happened ahead on road, and biker's fall, accident, crash or a mishap etc. Helmet 34 transmits that captured data with the current location (for example, using GPS) of the biker to computer 12 and system 100 for further processing.

In some implementations, a roadside worker wears helmet 36 while working on the road. Helmet 36 may be connected with computer 12 and system 100 directly through network 14 or through secondary network 18. Helmet 36 is shown wirelessly coupled to network 14 via wireless communication channel 48 established between helmet 36 and wireless access point (i.e., WAP) 28, which is shown directly coupled to network 14. WAP 28 may be, for example, an IEEE 802.11a, 802.11b, 802.11g, Wi-Fi®, RFID, and/or Bluetooth™ (including Bluetooth™ Low Energy) device that is capable of establishing wireless communication channel 48 between helmet 36 and WAP 28. Herein, helmet 34 is equipped with multiple sensors (not shown) and cameras (not shown). The sensors and cameras are involved for capturing data such as surrounding environment data and road construction in progress data etc. Helmet 36 transmits the captured data with current location (for example, using GPS) of the workers to computer 12 and system 100 for further processing.

In some implementations, vehicle uses Vehicle to Everything (V2X) communication. V2X is a vehicular communication system that supports the transfer of information from a vehicle to moving parts (any entity) of the traffic system that may affect the vehicle or may be affected by the vehicle. V2X serves to organise communication and interaction between vehicle to vehicle (V2V), vehicle to infrastructure (V2I), vehicle to pedestrians (V2P), and vehicle to networks (V2N). The main purpose of V2X technology is to improve road safety, energy savings, and traffic efficiency on the roads. For example, car 38 is may be connected with computer 12 and system 100 directly through network 14 or through secondary network 18. In some implementations, car 38 may be connected with cloud server. Car 38 is shown wirelessly coupled to network 14 via wireless communication channel 50 established between car 38 and wireless access point (i.e., WAP) 30, which is shown directly coupled to network 14. WAP 30 may be, for example, an IEEE 802.11a, 802.11b, 802.11g. Wi-Fi®, RFID, and/or Bluetooth™ (including Bluetooth™ Low Energy) device that is capable of establishing wireless communication channel 50 between car 38 and WAP 30. Herein, car 38 is equipped with multiple sensors (not shown) and cameras (not shown). The sensors and cameras are involved for capturing data such as surrounding environment data, road condition (for example, pothole), traffic information (such as traffic jam information and traffic regulation information), road safety information etc. Car 38 transmits the captured data with current location (for example, using GPS) of the car to computer 12 and system 100 for further processing.

In some implementations, traffic signal apparatus 40 is shown wirelessly coupled to network 14 via wireless communication channel 52 established between traffic signal apparatus 40 and wireless access point (i.e., WAP) 32, which is shown directly coupled to network 14. WAP 32 may be, for example, an IEEE 802.11a. 802.11b, 802.11g, Wi-Fi®, RFID, and/or Bluetooth™ (including Bluetooth™ Low Energy) device that is capable of establishing wireless communication channel 52 between traffic signal apparatus 52 and WAP 32. Traffic signal apparatus 40 is equipped with transmitter (not shown). Transmitter broadcasts, on a regular basis, traffic signal data identifying its location (e.g., by broadcasting, for example, GPS coordinates associated with its location). In addition, traffic signal apparatus 40 transmits traffic signal data identifying present and future traffic signal sequences, e.g., current information regarding the status of the light (red, greed, or yellow), timing data related to its cycle, and any schedule information regarding future cycles (e.g., if at a particular time of day, the timing of the signal cycle changes due to changing traffic conditions, this information is also transmitted). In some implementation, traffic signal apparatus 40 is equipped with multiple sensors (not shown) and surveillance cameras (not shown).

In some implementations, the surveillance cameras of traffic signal may be a single panoramic camera or a plurality of cameras for outgoing lanes, each camera capturing traffic flow images in the intersection and on the corresponding outgoing lane before a green light is on, and sending the traffic flow images to computer 12 and system 100 for processing. In some implementations, road sensors (not shown) of traffic signal apparatus 40 are used when recording of accurate vehicle speed is required in addition to traffic light violation. Traffic signal apparatus 40 transmits the recorded data with current location (for example, using GPS) of traffic signal apparatus 40 to computer 12 and system 100 for further processing.

In some implementations, some or all of the IEEE 802.11x specifications may use Ethernet protocol and carrier sense multiple access with collision avoidance (i.e., CSMA/

CA) for path sharing. The various 802.11x specifications may use phase-shift keying (i.e., PSK) modulation or complementary code keying (i.e., CCK) modulation, for example, Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
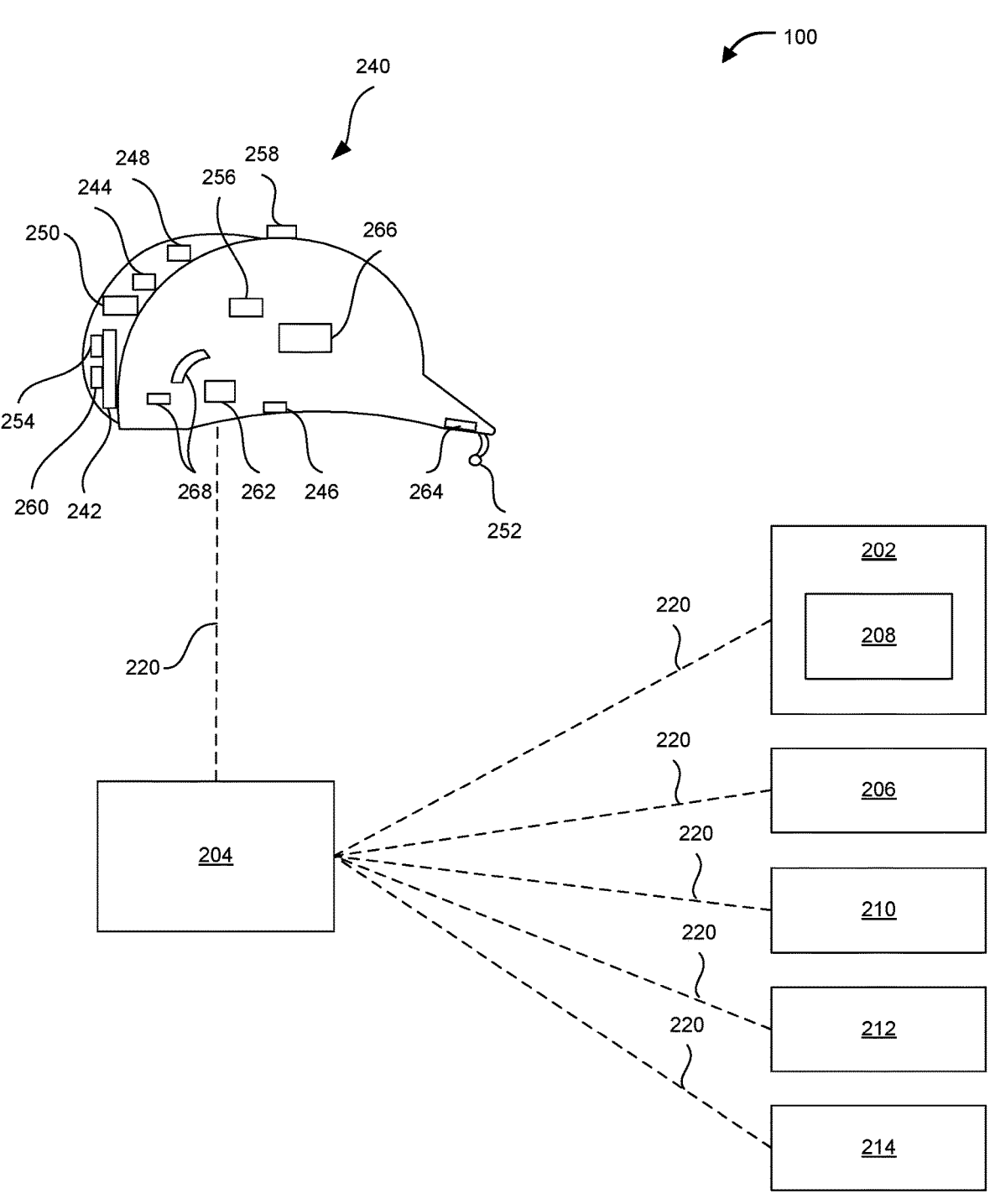
FIG. 2 illustrates a schematic illustration of the system of FIG. 1 as implemented for active threat monitoring with a user worn helmet, in accordance with one or more exemplary embodiments of the present disclosure.

Referring now to FIG. 2, illustrated is a schematic of the system 100 implemented as a threat monitoring system for active threat monitoring, in accordance with one or more exemplary embodiments of the present disclosure. As shown, the system 100 includes a controller 204. Herein, the controller 204 may be a processing device, system or part thereof that controls at least one operation of the device. The controller 204 may be implemented in hardware, firmware or software, or some combination of at least two of the same. It should be noted that the functionality associated with any particular controller may be centralized or distributed, whether locally or remotely. The controller 204 may be a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. Further, the memory may include one or more non-transitory computer-readable storage media that can be read or accessed by other components in the device. The memory may be any computer-readable storage media, including volatile and/or non-volatile storage components, such as optical, magnetic, organic or other memory or disc storage, which can be integrated in whole or in part with the device. In some examples, the memory may be implemented using a single physical device (e.g., optical, magnetic, organic or other memory or disc storage unit), while in other embodiments, the memory may be implemented using two or more physical devices without any limitations.

As illustrated in FIG. 2, the system 100 further includes an internet of things (IoT) cloud server 202. The terms "internet of things (IoT) cloud server" and "server" have been interchangeably used hereinafter without any limitations. Hereinafter, the internet of things (IoT) cloud server is represented as "server 202". The server 202 is shown to be a cloud server or an IoT server, as will be explained later in the description. The server 202 that can be used to monitor or manage attributes, activities, or other states associated with the various IoT devices. Herein, the IoT devices may be smart mobiles, smart refrigerators, smartwatches, smart fire alarms, smart door locks, smart bicycles, sensors, fitness trackers, smart security system, actuators, gadgets, appliances, or machines, without any limitations. The server utilizes cloud computing technology which is divided into various types of servers (apps server, web server, database server) with server cluster, making things convenient for the server software and hardware dynamically. The server may be any computer or hardware on which the services that clients use reside. Services available on the server are transmitted from the server software to the client software over communication lines in packets of data according to defined protocols. Generally, the term "server" means a discrete host computer in a network, and it provides services to other computers or devices, termed "clients". For purposes of the example embodiments described herein, the term "server" includes machines that may be essentially any interconnected computer systems. The use of terms such as "server" is not meant to imply that any particular machine may only be performing host function, or that any particular machine cannot be acting as a client computing platform in any particular circumstance. In some examples, the term "server" as used herein, may also represent a crowd server, a blockchain server, or the like without departing from the spirit and the scope of the present disclosure.

Figure 7:
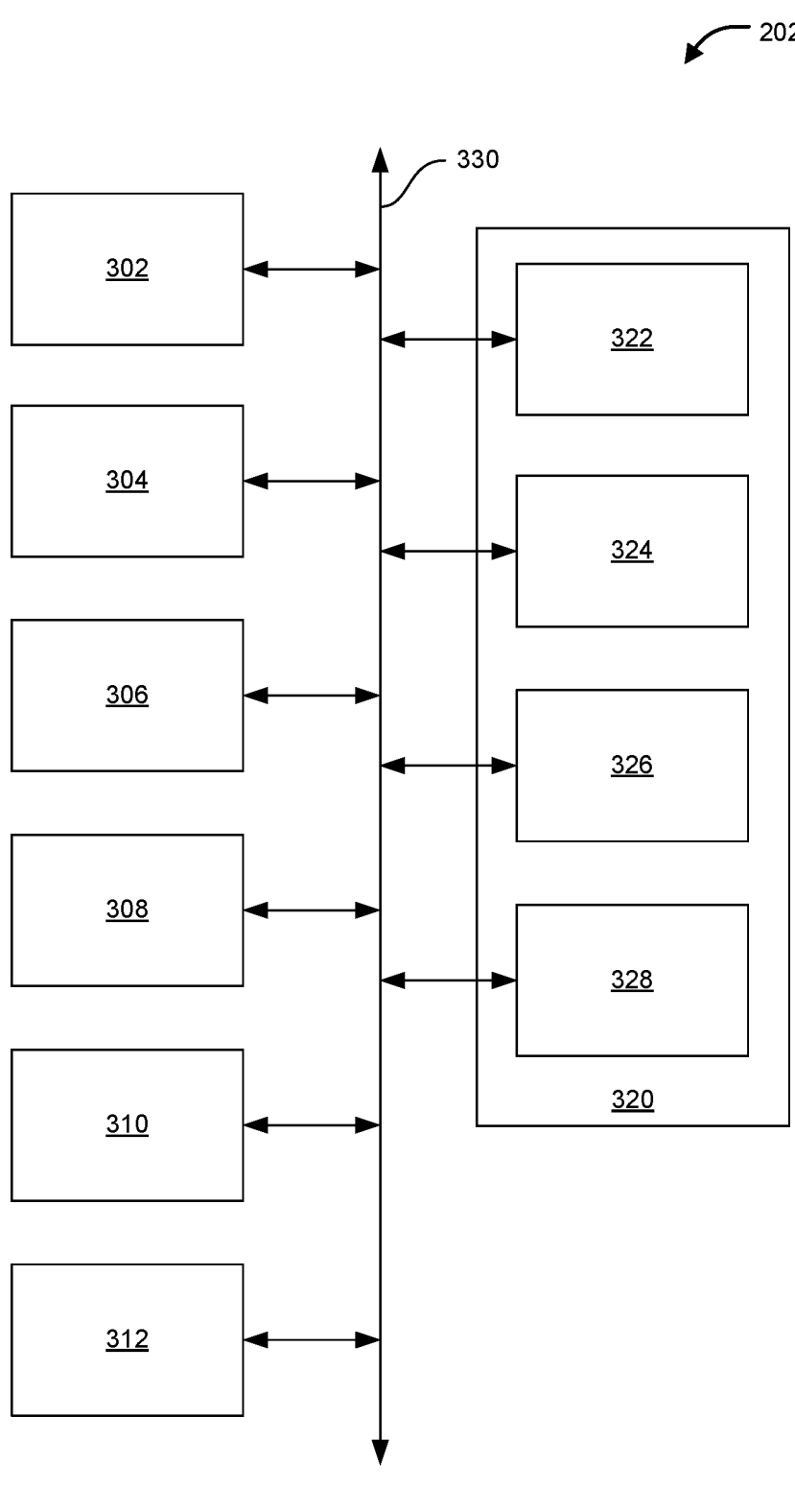
FIG. 7 illustrates a block diagram illustration of a server, in accordance with one or more exemplary embodiments of the present disclosure.

FIG. 7 is a block diagram of an example of the server capable of implementing embodiments according to the present disclosure. In the example of FIG. 7, the server 202 includes a central processing unit 302 (hereinafter, referred to as CPU 302) (similar to a controller 204) for running software applications and optionally an operating system. As illustrated, the server 202 further includes a memory 304 which stores applications and data for use by the CPU 302. Storage 306 provides non-volatile storage for applications and data and may include fixed disk drives, removable disk drives, flash memory devices, and CD-ROM, DVD-ROM or other optical storage devices. An optional user input device 308 includes devices that communicate user inputs from one or more users to the server 202 and may include keyboards, mice, joysticks, touch screens, etc. A communication interface 310 is provided which allows the server 202 to communicate with other computer systems (including the controller 204 of FIG. 2) via an electronic communications network, including wired and/or wireless communication and including an Intranet or the Internet (such as, the network 220 of FIG. 2). The communication interface 310 may comprise a transmitter and receiver for communicating with remote devices. An optional display device 312 may be provided which may be any device capable of displaying visual information in response to a signal from the server 202. The components of the server 202, including the CPU 302, the memory 304, the data storage 306, the user input devices 308, the communication interface 310, and the display device 312, may be coupled via one or more data buses 330.

Further in some examples, as illustrated in FIG. 7, a graphics system 320 may be coupled with the data bus 330 and the components of the server 202. The graphics system 320 may include a physical graphics processing unit (GPU) 322 and graphics memory. The GPU 322 generates pixel data for output images from rendering commands. The physical GPU 322 may be configured as multiple virtual GPUs that may be used in parallel (concurrently) by a number of applications or processes executing in parallel. For example, mass scaling processes for rigid bodies or a variety of constraint solving processes may be run in parallel on the multiple virtual GPUs. Graphics memory may include a display memory 324 (e.g., a framebuffer) used for storing pixel data for each pixel of an output image. In another embodiment, the display memory 324 and/or additional memory 326 may be part of the memory 304 and may be shared with the CPU 302. Alternatively, the display memory 324 and/or additional memory 326 may be one or more separate memories provided for the exclusive use of the graphics system 320. In another embodiment, graphics processing unit 320 includes one or more additional physical GPUs 328, similar to the GPU 322. Each additional GPU 328 may be adapted to operate in parallel with the GPU 322. Each additional GPU 328 generates pixel data for output images from rendering commands. Each additional physical GPU 328 may be configured as multiple virtual GPUs that may be used in parallel (concurrently) by a number of applications or processes executing in parallel, e.g., processes that solve constraints. Each additional GPU 328 may operate in conjunction with the GPU 322, for example, to simultaneously generate pixel data for different portions of an output image, or to simultaneously generate pixel data for different output images. Each additional GPU 328 may be located on the same circuit board as the GPU 322, sharing a connection with the GPU 322 to the data bus 330, or each additional GPU 328 may be located on another circuit board separately coupled with the data bus 330. Each additional GPU 328 may also be integrated into the same module or chip package as the GPU 322. Each additional GPU 328 may have additional memory, similar to the display memory 324 and additional memory 326, or may share the memories 324 and 326 with the GPU 322. It is to be understood that the circuits and/or functionality of GPU as described herein could also be implemented in other types of processors, such as general-purpose or other special-purpose coprocessors, or within a CPU.

Referring back to FIG. 2, as illustrated, the server 202 includes an IoT database 208. In other words, the IoT database 208 is provided at the server 202. As used herein, the term "database" generally refers to a collection of data arranged for ease and speed of search and retrieval. The IoT database 208 is an IoT native database with high performance for data management and analysis, deployable on the edge and the cloud. Due to its light-weight architecture, high performance and rich feature set together with its deep integration with Apache Hadoop, Spark and Flink, Apache IoTDB can meet the requirements of massive data storage, high-speed data ingestion and complex data analysis in the IoT industrial fields. While the following description focuses on generating transaction statements for relational databases, those skilled in the art will recognize the methods described herein may be used with any type of database including an object-relational database and an XML-based database. The IoT database 208 may include any physical or logical arrangement of records. In some embodiments, one or more of the databases share content with one or more other databases. Thus, the databases are not necessarily mutually exclusive. Indeed, some databases may be entirely contained by other databases. In embodiments of the present disclosure, the IoT database 208 is configured to store general environmental data, user data from other systems or source or platform, data from other wearable device or mobile unit or IoT devices, and data from vehicle or sports equipment or tool, and the like, without limitation. In particular, such information is stored in the database for later retrieval, as required.

The IoT database 208 is configured to generate virtual data feed based on the data received from various IoT devices. Herein, the IoT devices may be smart mobiles, smart refrigerators, smartwatches, smart fire alarms, smart door locks, smart bicycles, sensors, fitness trackers, smart security system, actuators, gadgets, appliances, or machines, without any limitations. In one implementation, the virtual data feed is received from a plurality of virtual sensors or a plurality of remote sensors disposed on the IoT devices or coupled with the IoT devices. The virtual sensor is also known as a synthetic sensor. The terms "virtual sensor" and "synthetic sensor" have been interchangeably used hereinafter without any limitations. In a non-limiting example, the synthetic sensors provide virtual data feed to the IoT database 208. The synthetic sensor's data is a virtual sensor's from different devices (IoT devices) or systems that is similar to physical inputs of the physical sensors. For example, a rain sensor is disposed in a remote device which transmits the data related to rain to the cloud server which could be a synthetic sensor's input from the remote device. Herein, the rain sensor acts as a virtual sensor for the system 100.

The virtual data feed comprises cloud-based data. The cloud-based data are stored at the IoT database 208. Herein, the cloud-based data comprises at least one of weather data, historical data, data on amount of light falling on the user's eyes, SOS alert information, environmental data, and data received from other users.

The virtual data feed further comprises peer to peer communication data. The peer to peer communication data are stored at the IoT database 208. The peer to peer communication data is vehicle to everything (V2X) data received from peer devices. Herein, the peer devices may be vehicle, network, infrastructure, and pedestrian (who is equipped with any communication device, helmet, or V2P enabled device and the like). Herein, the peer to peer communication data includes vehicle-to-network communication, vehicle-to-vehicle communication, vehicle-to-pedestrian communication, and vehicle-to-infrastructure communication. These peer to peer communication data are transmitted to the IoT database 208 and later the peer to peer communication data are used as virtual data feed.

The synthetic sensor fuses the received data to generate the virtual data feed to be stored in the IoT database 208. In the present disclosure, the virtual data feed could be cloud data, mathematically computed data, map data, weather data, traffic data, spatial mapping of enemies when a soldier is using it in war field, police cop detected by the helmet of the rider in the front, any crash information detected by the camera on rider in front, and the like. For example, the bike rider could get feed of the road condition from a driver who is 1 km ahead from the rider for which the system 100 may be generating the virtual data feed. In a non-limiting example, the cloud-based data may be general environmental data, user data from other systems or source or platform, data from other wearable devices or mobile units, and data from vehicle or sports equipment or tool etc.

Referring to FIG. 2, in the exemplary illustration, the system 100 includes a head mounted wearable device 240. The head mounted wearable device 240 is shown to be a wearable device or a helmet or a safety accessory or a safety gear, as will be explained later in the description. The terms "head mounted wearable device" and "helmet" have been interchangeably used hereinafter without any limitations. Also, "helmet" and "device" have been interchangeably used hereinafter without any limitations. Although the present embodiments have been described with the head mounted wearable device 240 being the "helmet 240", it may be appreciated the head mounted wearable device may be any other type of helmet including, but not limited to, a helmet for biker, cyclist, sports person, roadside worker, mining worker, soldiers, and the like, and the teachings of the present disclosure may be applied to such other types of helmet generally in a similar manner. The terms "user", "rider", "biker" and "wearer" have been interchangeably used hereinafter without any limitations.

Figure 8:
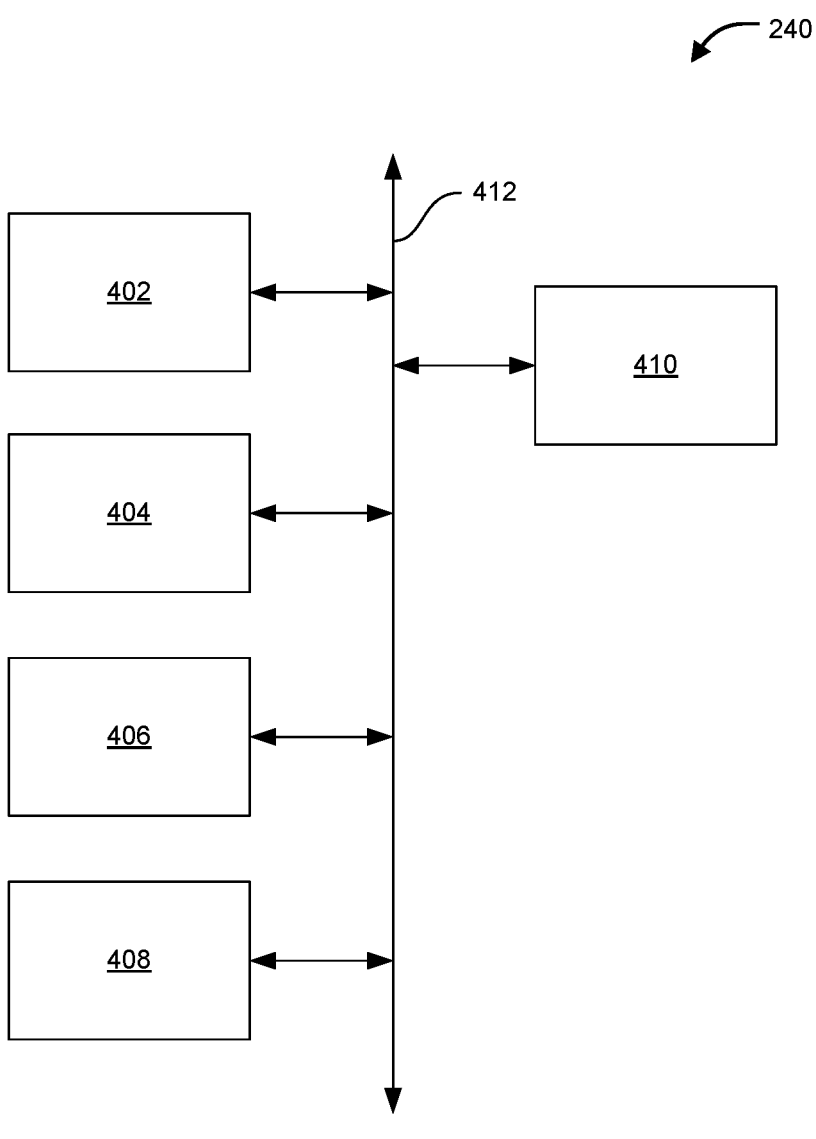
FIG. 8 illustrates a block diagram illustration of the user worn helmet, in accordance with one or more exemplary embodiments of the present disclosure.

As illustrated in FIG. 2, as discussed, the system 100 is implemented for active threat monitoring with the user worn helmet 240. Further as discussed, in embodiments of the present disclosure, the helmet 240 may embody a standalone unit, like a helmet for cyclists, a helmet for bikers, a helmet for mining workers, a helmet for sports persons, a helmet for soldier, a helmet for kid's games, and the like. FIG. 8 is a block diagram illustration of the helmet 240 capable of implementing embodiments according to the present disclosure.

As illustrated in FIG. 8, the helmet 240 includes a control circuit 402 (similar to controller 242) for running software applications and optionally an operating system. The control circuit 402 is operable to control operations of the corresponding helmet 240. Herein, the control circuit 402 may be any processing device, system or part thereof that controls operations of the helmet 240. The control circuit 402 may be implemented in hardware, firmware or software, or some combination of at least two of the same. It should be noted that the functionality associated with any particular controller may be centralized or distributed, whether locally or remotely. The control circuit 402 may be a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. Further, the memory may include one or more non-transitory computer-readable storage media that may be read or accessed by other components in the device. The memory may be any computer-readable storage media, including volatile and/or non-volatile storage components, such as optical, magnetic, organic or other memory or disc storage, which may be integrated in whole or in part with the device. In some examples, the memory may be implemented using a single physical device (e.g., optical, magnetic, organic or other memory or disc storage unit), while in other embodiments, the memory may be implemented using two or more physical devices without any limitations.

Further, as illustrated in FIG. 8, the helmet 240 includes a communication module 404 (similar to transceiver 244) which allows the helmet 240 to communicate with other computer systems (e.g., the controller 204 of FIG. 2) via an electronic communications network, including wired and/or wireless communication and including the Internet (such as, the network 220 of FIG. 2). Herein, the communication module 404 may be in the form of a network interface card which may implement a WAP, for example, an IEEE 802.11a, 802.11b, 802.11g. Wi-Fi®, RFID, and/or Bluetooth™ (including Bluetooth™ Low Energy) for establishing wireless communication channel (such as, the network 220 of FIG. 2). As shown in FIG. 2, the helmet 240 is shown wirelessly coupled to the network 220 via the communication module 404, which is shown coupled to the network 220. In the embodiments of the present disclosure, the communication module 404 is operable to connect to a network (such as, the network 220 of FIG. 2) for establishing connection with the controller 204. In the present system 100, the communication module 404 is further adapted to be disposed so as to communicate with the control circuit 402 to thereby enable signal communication between the control circuit 402 and the controller 204.

Further, as illustrated in FIG. 8, the helmet 240 may further include a user input device 406 is provided which is disposed in connection with the control circuit 402, and includes devices that communicate user inputs or commands (such as, voice inputs or commands) from one or more users as received from the input device (such as, microphone 246 of FIG. 2). In some examples, the helmet 240 may also include a display device 408 which may be any device capable of displaying visual information, including information received from the communication module 404. In some examples, as will be described later in the description, the display device 408 may be implemented for displaying visual information as received from the server 202 of FIG. 2. The helmet 240 further includes a black box (generally represented as a block 410) which may provide in the helmet 240 for logging the rider's location and speed at any given time. In the event of a mishap, the black box 410 records and holds important clues as to its occurrence. The components of the helmet 240 may be coupled via one or more data buses 412, as shown in FIG. 8.

Referring back to FIG. 2, the helmet 240 includes a battery 248. The term "battery" as used herein is defined to include any battery type, for example, rechargeable, non-rechargeable, alkaline, aluminum, lithium, lithium-ion, lithium ion polymer, nickel-cadmium, nickel-iron, nickel metal hydride, power capacitor, etc. The term "battery pack" as used herein is intended to include a housing or a casing or a support or one or more batteries. A battery pack may include electrical contacts that permit the battery to transmit power to other devices, whether directly or via a power bus. The battery 248 may be multiple battery devices or a single battery. In preferred embodiment of the present disclosure, the battery 248 is a single battery which is rechargeable. The battery 248 may be positioned on the top surface of the helmet 240 or on the side surface of the helmet 240. The helmet 240 provides a secure attachment for the battery 248 while permitting a user to quickly attach and detach the battery 248. The helmet 240 may be used in conjunction with multiple other electronic devices that requires power. Therefore, the battery 248 is used to power such other electronic devices. In one of the implementations, a solar panel (not shown) is provided on surface of the helmet 240 for converting solar energy into electric energy. Herein, the rechargeable battery 248 is used for storing the electrical energy.

Further, the helmet 240 includes a communications module 244. The communication module 244 may be utilized as a transceiver. Herein, transceiver is a combination of transmitter and receiver in a single package. The transceiver 244 can both transmit and receive radio waves using antenna, for communication purposes. An integrated-circuited type transceiver 244 is built into the helmet 240. The communication module 244 is coupled with the control circuit 242.

Figure 3:
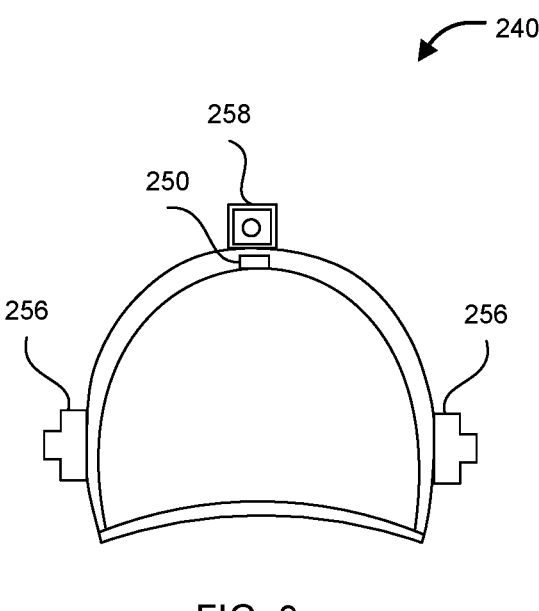
FIG. 3 illustrates a front view of the user worn helmet of FIG. 2, in accordance with one or more exemplary embodiments of the present disclosure.

As illustrated in FIG. 2 and FIG. 3, the helmet 240 further includes an antenna 250. In one of the embodiments, the helmet 240 with integrated-circuited type antennas built into the top portion of the helmet 240, so that any SoC (System on Chip) unit such as GPS or cell phone can best utilize the location of the antenna to maximize signal receipt and transmission. Any SoC unit may be fitted to slot(s) located at the inside surface of the helmet 240. The antenna 250 is secured inside the helmet 240 and coupled to the communications module 244. The communications module 244 allows two-way wireless communication between helmet 240 and other units.

As illustrated in FIG. 2 and FIG. 3, the helmet 240 further includes a plurality of physical sensors. The physical sensors are disposed in the helmet 240. The physical sensors include a front camera 252, a rear camera 254, side cameras 256, an aerial camera (not shown), a 360° view camera 258, and a radar 260. In general, the camera may be used for any imaging system that requires high resolution, high sensitivity, high SNR and small axial (or z) length. The lens system and photosensor design of camera allows the camera to be very small (e.g., 2 mm or less) in axial length and width, while providing sharp, high resolution, and fast image capture. Camera may thus be implemented in a small package size while still capturing sharp, high-resolution images, making the camera suitable for use as a still camera or video camera in small and/or mobile multipurpose devices such as cell phones, smartphones, pad or tablet computing devices, laptop, netbook, notebook, subnotebook, and ultrabook computers, and so on.

In the present disclosure, the cameras 252, 254, 256, 258 are disposed on the helmet 240. By way of example and not by way of limitation, these cameras may be built-in cameras with helmet or cameras attached to helmet through any means (may be connected through slots provided in the helmet). In general, the cameras 252, 254, 256, 258 are involved in capturing images and recording videos. For instance, the front camera 252 is mounted on the helmet 240 such so as to face the front camera 252 towards the wearer, as illustrated in the FIG. 2. The front camera 240 monitors driver awareness and attention (for example, a biker is properly holding the handle of the bike, his viewing direction, and the like). In particular, the front camera 252 is configured to monitor awareness, attention, and glanced based information of the user. One example of the glanced based information, when a user looks at McDonalds (detected using glance), provides additional information such as open hours, etc. over voice. The front camera 252 is further configured to capture images and record videos of the user. In one implementation, the helmet 240 may have another front camera (not shown) which is capturing front views in a travelling direction of the biker.

The rear camera 254 is mounted on the helmet 240. The rear mounted camera 254 is aimed at the road behind the biker. The rear camera 254 provides a constant rear view image which is independent of the rider's head and body position. In one example, the rear camera 254 captures an image of a vehicle which is approaching the biker. The captured images can be used for further processing, which is described later.

As illustrated in FIG. 2 and FIG. 3, the helmet 240 further includes side cameras 256. The helmet 240 may have two side cameras 256. By way of example and not by way of limitation, one side camera 256 is mounted on the left side of the helmet 240 and another side camera 256 is mounted on the right side of the helmet 240. The side cameras 256 may capture images of objects (e.g., biker or car or any vehicle etc.) which are approaching the biker from the left side or right side of the biker. The helmet 240 further includes an aerial camera (not shown). The aerial camera is mounted on top of the helmet 240.

As illustrated in FIG. 2 and FIG. 3, the helmet 240 further includes a 360° (e.g., spherical or cubical) view camera 258. The 360° view camera 258 can be a fisheye camera. The 360° view camera 258 provides a 360 degree view of the surroundings. The 360° view camera 258 is used for multiple purposes. The 360° view camera 258 is configured to capture images of the surrounding environment of the user and road condition (for example, pothole, road surface etc.).

In one purpose, the 360° view camera 258 is used to generate a 3D field view. The 360° view camera 258 is further configured to capture images for performing depth detection and for sending the captured images to the database 208. This happens in the helmet 240 and extended processing in the server 202. The depth calculation and object detection may be performed in the helmet 240.

Further, the 360° view camera 258 is used for advanced processing such as object granular classification (e.g., to track another cyclist in vicinity). The 360° view camera 258 is also configured to detect what could be an interesting scene to automatically capture and further the helmet 240 transmits the interesting scene to the database 208. For example, a nice scenic image of waterfall, this will be autodetected based on monitoring the glance of the user and him slowing down. By way of example and not by way of limitation, the 360° view camera 258 may be a built-in 360-degree camera with helmet 240 or the 360° view camera 258 is attached to the helmet 240 through any means (may be connected through a slot provided in the helmet).

Further, the helmet 240 includes a radar 260. In general, radar (radio detection and ranging) is a detection system that uses radio waves to determine the distance (ranging), angle, and radial velocity of objects relative to the site. In the present disclosure, the 360° view camera 258 is coupled with the radar 260. By using the image captured by the 360° view camera 258 and the radio waves of the radar 260, the helmet 240 can sense depth and also contentions in the field. In one example, an image of a pothole is captured by the 360° view camera 258. Thereafter, by using the captured image of the 360° view camera 258 and the radio waves of the radar 260, depth of the pothole can be sensed. In one implementation, the helmet 240 is equipped with a laser imaging, detection and ranging (LIDAR) (not shown). In general, the helmet-mounted LIDAR system may be used for diving in environments such as sewage treatment plant tanks, chemical plant waste and sludge pits and cooling tower sump basins, harbors, rivers, dams and lakes to complete tasks such as pier and dock inspections and repairs, underwater cutting and welding, ship inspections, repairs and maintenance, pipeline inspections and repairs, and major underwater construction projects.

Further, the helmet 240 includes a speaker 262. The speaker 262 is coupled with the control circuit 242 of the helmet 240. The speaker 262 is positioned and oriented such so as to provide audio signal to the helmet wearer without blocking surrounding sound, and without affecting the safety aspects of the helmet 240. The audio signal may be received through the communication module 244. The audio signals may be stored and/or emanate from the cloud server 202. The audio signals may also stream through a portable sound signal-producing device. The portable sound signal-producing device is a portable media player or digital audio player. The portable media player and the digital audio player are consumer electronics devices capable of storing and playing digital media including audio, images, video, and/or documents. The digital media is stored on a hard drive, microdrive, and/or flash memory.

Further, the helmet 240 includes a microphone 246. Herein, the helmet 240 is not limited to a single microphone. The helmet 240 may have a plurality of microphones The microphone 246 may be a mic. The microphone 246 is coupled with the control circuit 242 of the helmet 240. In an embodiment of the present disclosure, the microphone 246 can be attached to any suitable position on or inside of the body of the helmet 240. Preferably, the microphone 246 may be placed in the helmet 240 proximate the rider's mouth. The microphone 246 may be configured to receive voice commands from the rider. The microphone 246 may also be included to convert voice commands into electrical signals that may be used to operate the main functionality within the helmet 240, communicate with emergency services, telephone services, or other Bluetooth connected helmets. In one example, the microphone 246 may allow recording the voice commands or voice inputs of the rider while riding the bike. By way of example and not by way of limitation, the microphone 246 is connected with a mobile phone (not shown) through wirelessly or through wired connection. In one implementation, the microphone 246 may be a built-in microphone with the helmet 240 In another implementation, the microphone 246 may be a plug and play type microphone which can be attached to the helmet 240 through a slot (for example, a USB slot is provided in the helmet for plugging the microphone therewith).

Further, the helmet 240 includes a display device 264. The display device 264 may be provided which can be any device capable of displaying visual information in response to a signal from the server 202. In a non-limiting example, the display device 264 may be integrated with various head supported structures including goggles, eyewear, headbands, or any head supported structure which supports and positions a display such that the visual information is projected into the rider's eyes. The display device 264 may be located inside or outside the helmet 240. For example, the display device 264 could be installed within the interior or exterior region of the helmet 240. In an embodiment of the present disclosure, the display device 240 may be a visor mounted lighting and display system which can be used to provide a visual clue of the intensity by using the colour and brightness of the visor mounted lighting and display system.

Further, the helmet 240 includes a memory device (not shown). The memory device is associated with the computing device of the helmet which may store music, save user level settings, system level caches, BIT errors, and store temporary data locally. In one implementation, the memory device locally stores the images/videos captured by the cameras and thereafter, the images/videos are transmitted to the database 208. The memory device may be built-in memory device with the helmet 240 or a removable memory device. In a non-limiting example, the memory device may be a SD card (Secure Digital card).

Further, the helmet 240 includes a multimodal communication interface 266. In general, the multimodal communication interface 266 processes two or more combined user input modes or inputs related to the user states, such as speech, pen, touch, manual gestures, and gaze and head and body movements, in a coordinated manner with multimedia system output. In embodiments of the present disclosure, the multimodal communication interface 266 is configured to receive multimodal states/inputs related to the user for intent detection thereof. Herein, the multimodal states include at least one of user's speech, gesture, touch, brainwave, gaze, pupil movement, head movement and body movement. Also, the multimodal states may be for example, but is not limited to, intent detection of the wearer, his stress load and glance detection. The multimodal communication interface is configured to warn the user with directionality and intensity of the warning via multimodal communication. An example of the directionality of the warning, if the threat is approaching from the rear left, this position is communicated to the user by effecting electrical signals to the back portion of the left side of the car. In addition, the helmet 240 provides a visual clue of the intensity by using the colour and brightness of the visor mounted lighting and display system 264. An example of intensity of the warning, in case, the user is ignoring the warning with the low warning intensity then the high warning intensity is used for warning the user. Herein, the multimodal communication may be for example, but is not limited to, bone conduction communication via a bone conduction device 268, visual and audible communication via the display 264, augmented reality projection, virtual reality projection, stationary display, light, sound, electric pulses, etc.

In particular, the multimodal communication interface 266 is configured to receive multimodal states related to the user in conjunction with the front camera 252. The front camera 252 is configured to capture the user's speech (which is captured with help of the speaker 262 of the FIG. 2), gesture, touch, brainwave, gaze, pupil movement, head movement and body movement as the multimodal states of the user. In case, the user is receiving the warning via the multimodal communication with visual and audible communication via the display 264. However, the user is not responding to the warning. In other words, the user is ignoring the warning. In this case, the system 100 detects the intent of the user and may use another multimodal communication for warning the user which may be the bone conduction communication via a bone conduction device 268 or light or sound or electric pulses, and the like.

As illustrated in FIG. 2, the system 100 further includes a user database 206. The user database 206 is configured to store user profile data. As used herein, the term "database" generally refers to a collection of data arranged for ease and speed of search and retrieval. While the following description focuses on generating transaction statements for relational databases, those skilled in the art will recognize the methods described herein may be used with any type of database including an object-relational database and an XML-based database. The database may include any physical or logical arrangement of records. In some embodiments, one or more of the databases share content with one or more other databases. Thus, the databases are not necessarily mutually exclusive. Indeed, some databases may be entirely contained by other databases. In embodiments of the present disclosure, the user database 206 is configured to maintain user information such as user profile data, nature of activity, historical information of user (for example, whether user is a pro-rider or not; history of fall), biometric data (for example, brainwave, heart rate, vitals, etc.), risk profile of user such as health risk, tolerance to risk, and the like, without limitation. Herein, an example of historical information, if a rider previously had a fall when the gradient of climb was 20 degrees.

As illustrated in FIG. 2, the system 100 further includes an environment monitoring unit 210. The environment monitoring unit 210 is configured to map an environment based on at least of one of the visual feed, the radar feed, and the virtual data. In particular, the environment monitoring unit 210 receives the visual feed and the radar feed from the plurality of physical sensors and the virtual data feed from the IoT database 208. The environment monitoring unit 210 is configured to map a visual feed of the plurality of physical sensors with a corresponding virtual data feed stored at the IoT database 208. For example, the 360° view camera captures an image of a pothole on the road. The environment monitoring unit 210 receives the captured image, Thereafter, the environment monitoring unit 210 receives the same pothole image from the IoT database 208. Herein, the IoT database 208 already has the same pothole image of the road which was earlier captured and sent by other devices (by another helmet device or by a car) who passed by the same road in the past. Thereafter, the environment monitoring unit 210 is configured to map the captured image of the 360° view camera and the received image from the IoT database 208, for an environment.

As illustrated in FIG. 2, the system 100 further includes an awareness unit 212. The awareness unit 212 is configured to generate an environmental context based on the position of a user. The awareness unit 212 may be using audio and visual methods to proactively study the threat vectors around the user. The environmental context may be generated based on the position of the user. Further, the environmental context is involved for environment modelling, for example, where the user is, what the user is doing, and what is the risk profile of the user, all of this information is used in the environment modelling. For example, in case of cyclists wearing the helmet 240, the vehicle tailgating, the distance of the vehicle, approach angle may be used for threat modelling or environment modelling. Moreover, the tilt to sides could also be another threat vector. In another example, in the case of a mining worker, it is about checking if there is any threat of something that could fall on the mining worker. Also, there is risk of tripping and falling on the mining worker due to path undulations. In one more example, in the case of sports men, for example, when someone is going to crash into him accidentally. In some examples, a golf ball hits a person when he is not prepared. The awareness unit 212 is also configured for augmenting environment modelling with cloud-based processing to augment with the context of the user. Here, local processing and cloud augmentation are involved for accuracy enhancement.

As illustrated, the system 100 further includes an interesting event detection unit 214 for capturing interesting moments data from sport or work activity. The interesting event detection unit 214 may be coupled with the controller 204, the user database 206, the IoT database 208, the environment monitoring unit 210, and the awareness unit 212. The interesting event detection unit 214 receives the captured video, photos, and sensor data to capture the interesting moments. The interesting event detection unit 214 transmits the captured interesting moments data to the IoT database 208 for storing therein. The interesting moments data stored at the IoT database 208 is further utilized for other purposes, for example, the interesting moments data may be shared with friends, colleagues, social media and the like.

Referring to FIG. 2 and FIG. 7, the cloud computing or cloud processing is implemented at the IoT server 202, but not limited to, artificial intelligence (AI), cloud based intelligence, augmenting edge-based capability with cloud based intelligence, machine learning models, etc. The server 202 is trained itself by artificial intelligence/neural network. In one embodiment, the server 202 may also train the helmet 240 by artificial intelligence/neural network.

As illustrated in FIG. 2, the controller 204 is wirelessly coupled with the server 202, the user database 206, the environment monitoring unit 210, the awareness unit 212, and the interesting event detection unit 214. The controller 204 is configured to receive the user profile data from the user database 206, the mapped environment from the environment monitoring unit 210, the environment context from the awareness unit 212, and the virtual data feed from the IoT database 208.

The controller 204 is further configured to analyse the user profile data, the visual feed and the radar feed, the environment context, and the virtual data feed. Herein, the controller 204 is in communication with the IoT server 202 to implement the artificial intelligence (AI) for processing and analysing the user profile data, the visual feed, and the radar feed, the environment context, and the virtual data feed.

The controller 204 is further configured to predict occurrence of threat based on the analysed data (for computing/processing the threat). The artificial intelligence/neural network is involved in predicting the occurrence of threat. Herein, in a non-limiting example, threat may be fall, accident, crash or a mishap. Herein, the threat may be anticipated head on, rear end by other objects, persons, in visible and invisible range, etc. The threat prediction or threat detection is real time and time sensitive. For example, a rider approaching a pothole, the warning has to be in seconds ahead of him going down that trajectory. Another example, a golf ball that is going to hit a person. The threat detection has to happen in near real time.

Referring to FIG. 2 and FIG. 3, the controller 204 is further configured to warn the user about a threat based on the predicted occurrence of the threat via the multimodal communication interface 266. Specifically, the controller 204 transmits the predicted occurrence of the threat to the helmet 240. Herein, the multimodal communication interface 266 warns the user with directionality and intensity of the warning via multimodal communication. The controller 204 uses the multimodal communication such as haptics, bone conduction communication, visual and audible communication, augmented reality projection, virtual reality projection, and stationary display for warning the user. Herein, the multimodal communication interface 266 warns the user with directionality and intensity of the warning. For example, if the threat is approaching from the rear left, this is positionally communicated to the user by effecting electrical signals or bone conduction to the back portion of the left side of the car. In addition, the helmet 240 provides a visual clue of the intensity by using the colour and brightness of the visor mounted lighting and display system 264. For active threat monitoring, the controller 204 always uses more than one multimodal communication for warning the user.

In one or more embodiments, the controller 204 is further configured to process the threat based on the analysed data and transmits the processed threat data over V2X (vehicle to everything) communication to the peer devices. In another example, if utility workers wear the helmet when they are working on the road, the cars around get alert about these users in the field even before they come into visible range of the car. In some examples, when a biker rider wears the helmet when he is riding the bike. A car accident or car crash occurs on the road in front of the rider and that is, captured by the physical sensors of the helmet 240. In this case, the helmet 240 broadcasts the alert about the car accident or car crash, to the peer devices.

In one or more embodiments, the controller 204 is further configured to determine a threshold level for warning the user, wherein the user is warned if the predicted occurrence of the threat is greater than the determined threshold level. Herein, the controller 204 implements the artificial intelligence for determining threshold level for warning the user. The determined threshold level is compared with the predicted occurrence of the threat. In particular, when the predicted occurrence of the threat is greater than the determined threshold level, the controller 204 warns the user via the helmet 240.

The controller 204 is also configured to perform fusion of sensor data from camera, radar, vehicle to everything data to detect the significance of the threats. Further, the controller 204 is configured to implement machine learning models to understand what qualifies for warning a particular user. The warning levels vary considerably between the users, the environment they are in and also the type of activity they are involved in. The controller 204 may identify these criteria (warning levels) and warn the user only about the threats that matter for the particular user. In a specific example for determining threshold level, the user (biker) is riding a bike on the road. On the same road, other cyclists are also riding the cycle. The other cyclists who are in 5 feet distance behind the biker. In this case, the other cyclists will not be a threat to the biker. Herein, if the predicted occurrence of the threat is less than the determined threshold level; and based on the prediction, the controller 204 ignores the threat since the warning level is considerably low. However, in the case of a car, when the user (biker) is riding a bike on the road and on the same road the car is approaching at a higher speed behind the user. For example, when the car is coming into a 100 meter range of the user; in this case, the car will be a threat for the user. Herein, the predicted occurrence of the threat is greater than the determined threshold level; and based on the prediction, the controller 204 sends a warning to the user via the helmet 240.

In one implementation, the system 100 involves augmenting predictions based on cloud based processing which helps in threat monitoring. The helmet 240 has limited compute and storage capabilities. Some portions of the data captured by the helmet 240 will be moved to the server 202 to do threat detection. For example, if there is a road signage about a potential hazard. The 360° view camera captures an image of the road signage. Herein, the captured image (for example, road signage) may be in form of raw data specifically, image of the road signage with steepness (sharp slope) provided thereon. Thereafter, the helmet 240 transmits the captured image of the road signage with steepness (sharp slope) to the server 202. The server 202 calculates the steepness value based on the image received from the helmet 240. The server 202 detects that the steepness value is greater than 15 degrees. The steepness value is further being used to calibrate the warnings to be provided to the user. For example, in a gradient condition, the risk of tailgater crashing on the cyclist is much higher.

Further, the system 100 further involves augmenting edge-based capability with cloud based intelligence in threat monitoring. It is possible that the same detection logic explained above runs on MEC/Network EDGE which is located in a kilometre radius rather than going to a cloud server. This decreases the latency in detection. For example, raw images of the road are used to detect potholes in the EDGE. This is used to seek for the threat of a rider running into the pothole and falling.

Figure 4:
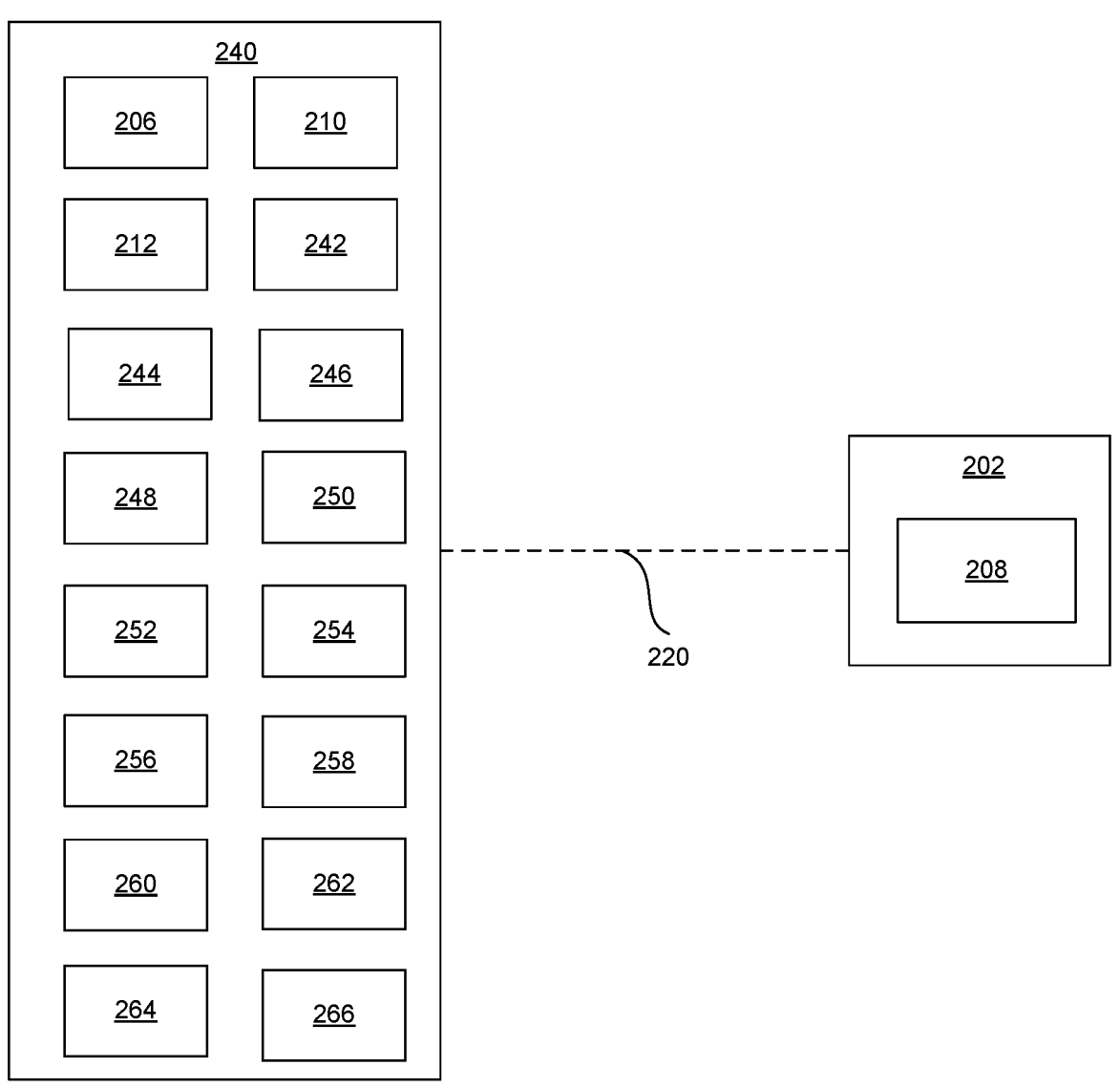
FIG. 4 illustrates a block diagram illustration of the system of FIG. 1 as implemented for active threat monitoring in the user worn helmet, in accordance with preferred embodiment of the present disclosure.

In one or more embodiments, the controller 204, the user database 206, the environment monitoring unit 210, and the awareness unit 212 are disposed in the head mounted wearable device 240, as illustrated in FIG. 4, as will be described later in the description.

Figure 5:
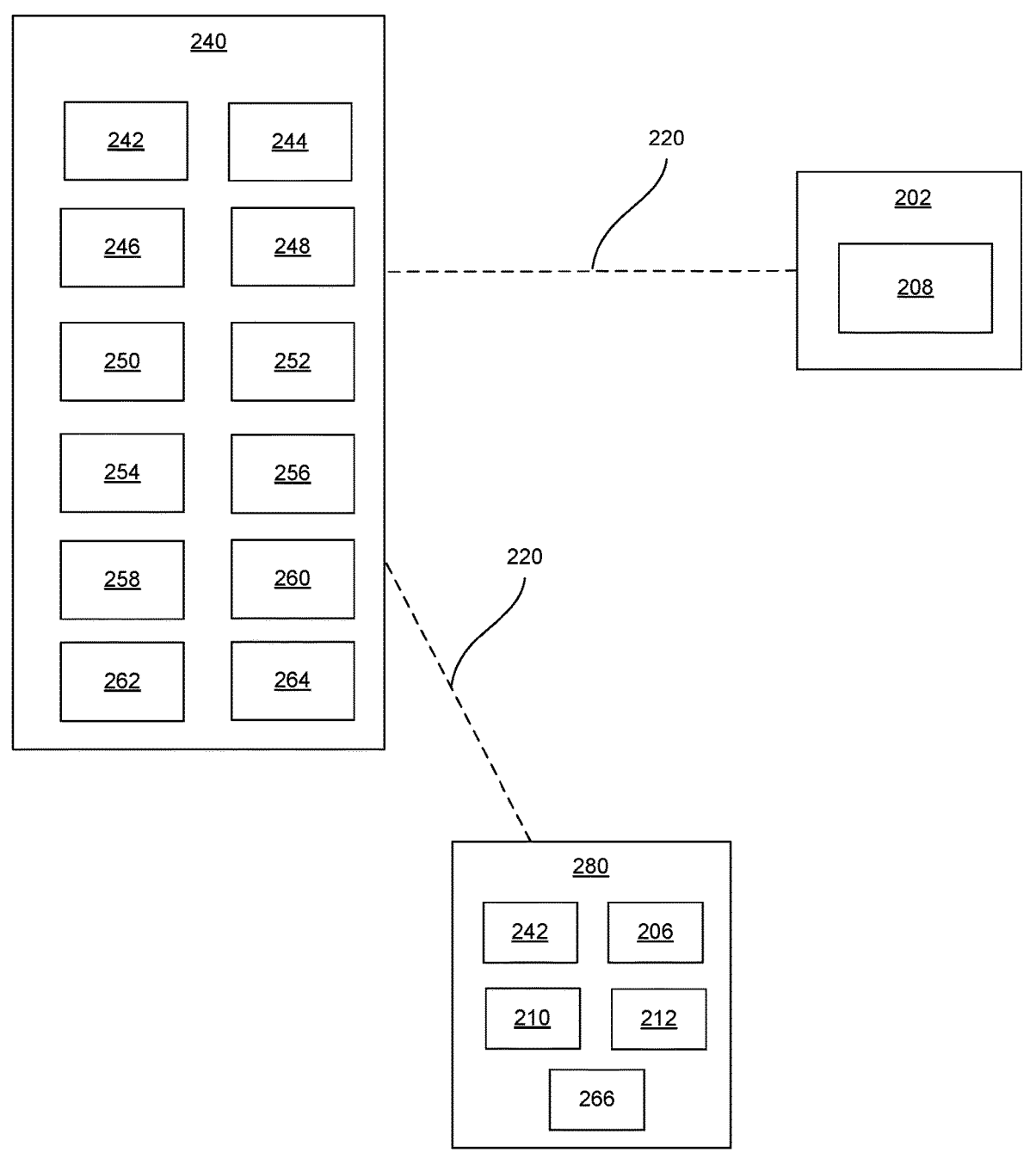
FIG. 5 illustrates a block diagram illustration of the system of FIG. 1 as implemented for active threat monitoring in the user worn helmet with a user device, in accordance with one or more exemplary embodiments of the present disclosure.

In one or more embodiments, the controller 204, the user database 206, the environment monitoring unit 210, the awareness unit 212, and the multimodal communication interface 266 are operationally configured on a user device 280, as illustrated in FIG. 5, as will be described later in the description.

In another aspect of the present disclosure and in the preferred embodiment, the threat monitoring system 100 is implemented at the helmet 240, as illustrated in FIG. 4. In particular, the head mounted wearable device 240 (that is, "device 240" or "helmet 240") is in communication with an Internet of Things (IoT) cloud server 202 (hereinafter, "server 202"). The terms "device 240" and "helmet" have been interchangeably used hereinafter without any limitations. The server 202 includes an IoT database 208 wherein the IoT database 208 is configured to generate virtual data feed. The communication module 404 of the helmet 240 is operable to connect to a network (such as, the network 220 of FIG. 4) for establishing connection with the server 202. The server 202, the IoT database 208, and the virtual data feed are already explained in the above paragraphs.

The helmet 240 includes the plurality of physical sensors. Herein, the plurality of physical sensors is configured to sense and generate at least one of visual feed and radar feed. Herein, the plurality of sensors, visual feed, and radar feed are already explained in the above paragraphs.

As illustrated in FIG. 4, a user database 206, an environment monitoring unit 210, and an awareness unit 212 are disposed in the helmet 240. Herein, the user database 206, the environment monitoring unit 210, and the awareness unit 212 of the server 202 are now disposed in the helmet 240, as illustrated in FIG. 4. The user database 206 is configured to store user profile data. The environment monitoring unit 210 is configured to map an environment based on at least of one of the visual feed, the radar feed, and the virtual data. The awareness unit 212 is configured to generate an environmental context based on the position of a user.

Referring to FIG. 7, the cloud computing or cloud processing is implemented at the IoT server 202, but not limited to, artificial intelligence (AI), cloud based intelligence, augmenting edge-based capability with cloud based intelligence, machine learning models, etc. The server 202 is trained itself by artificial intelligence/neural network. In one embodiment, the server 202 may also train the helmet 240 by artificial intelligence/neural network.

As illustrated in FIG. 4, the helmet 240 includes the communication module 244 which allows the helmet 240 to communicate with the server 202 via an electronic communications network, including wired and/or wireless communication and including the Internet (such as, the network 220 of FIG. 2). Herein, the communication module 244 may be in the form of a network interface card which may implement a WAP, for example, an IEEE 802.11a, 802.11b, 802.11g, Wi-Fi®, RFID, and/or Bluetooth™ (including Bluetooth™ Low Energy) for establishing wireless communication channel (such as, the network 220 of FIG. 2). As shown in FIG. 4, the helmet 240 is shown wirelessly coupled to the network 220 via the communication module 244, which is shown coupled to the network 220. In the embodiments of the present disclosure, the communication module 244 is operable to connect to a network (such as, the network 220 of FIG. 2) for establishing connection with the server 202.

Further, the helmet 240 includes a controller 242. Referring to FIG. 2 and FIG. 4, the controller 242 of the helmet 240 is similar to the controller 204 of the system 100. The controller 242 is operationally coupled with the user database 206, the environment monitoring unit 210, and the awareness unit 212. The controller 242 is configured to receive the user profile data from the user database 206, the mapped environment from the environment monitoring unit 210, the environment context from the awareness unit 212, and the virtual data feed from the IoT database 208.

The controller 242 is further configured to analyse the user profile data, the visual feed and the radar feed, the environment context, and the virtual data feed. The controller 242 is configured to implement the artificial intelligence (AI) for processing and analysing the user profile data, the visual feed, and the radar feed, the environment context, and the virtual data feed In one embodiment, the controller 242 is in communication with the server 202 to implement the artificial intelligence (AI) at the server 202 for processing and analysing the user profile data, the visual feed, and the radar feed, the environment context, and the virtual data feed.

The controller 242 is further configured to predict occurrence of threat based on the analysed data (for computing/ processing the threat). The artificial intelligence/neural network is involved in predicting the occurrence of threat. Herein, in a non-limiting example, threat may be fall, accident, crash or a mishap. Herein, the threat may be anticipated head on, rear end by other objects, persons, in visible and invisible range, etc. The threat prediction or threat detection is real time and time sensitive.

Referring to FIG. 2 and FIG. 4, the controller 242 is further configured to warn the user about a threat based on the predicted occurrence of the threat via the multimodal communication interface 266. Herein, the multimodal communication interface 266 warns the user with directionality and intensity of the warning via multimodal communication. The controller 242 uses the multimodal communication such as haptics, bone conduction communication, visual and audible communication, augmented reality projection, virtual reality projection, and stationary display for warning the user. Herein, the multimodal communication interface 266 warns the user with directionality and intensity of the warning. For example, if the threat is approaching from the rear right, this position is communicated to the user by bone conduction to the back portion of the right side of the car. In addition, the helmet 240 provides a visual clue of the intensity by using the colour and brightness of the visor mounted lighting and display system 264. For active threat monitoring, the controller 242 may use more than one multimodal communication for warning the user.

In one or more embodiments, the controller 242 is further configured to process the threat based on the analysed data and transmits the processed threat data over V2X (vehicle to everything) communication to the peer devices. In another example, if utility workers wear the helmet when they are working on the road, the cars around get alert about these users in the field even before they come into visible range of the car. In some examples, when a biker rider wears the helmet when he is riding the bike, and a car accident or car crash may have occurred on the road in front of the rider and that has been captured by the physical sensors of the helmet 240; in this case, the helmet 240 broadcasts the alert about the car accident or car crash, to the peer devices.

In one or more embodiments, the controller 242 is further configured to determine a threshold level for warning the user, wherein the user is warned if the predicted occurrence of the threat is greater than the determined threshold level. Herein, the controller 242 implements the artificial intelligence for determining threshold level for warning the user. The determined threshold level is compared with the predicted occurrence of the threat. In particular, when the predicted occurrence of the threat is greater than the determined threshold level, the controller 242 warns the user.

The controller 242 is also configured to perform fusion of sensor data from the cameras, the radar, vehicle to everything data in order to detect the significance of the threats. Further, the controller 242 is configured to implement machine learning models to understand what qualifies for warning a particular user. The warning levels vary considerably between the users, the environment they are in and also the type of activity they are involved in. The controller 242 may identify these criteria (warning levels) and warn the user only about the threats that matter for the particular user. If the predicted occurrence of the threat is less than the determined threshold level, the controller 242 ignores the threat since the warning level is considerably low. If the predicted occurrence of the threat is greater than the determined threshold level, the controller 242 sends a warning to the user.

Figure 6:
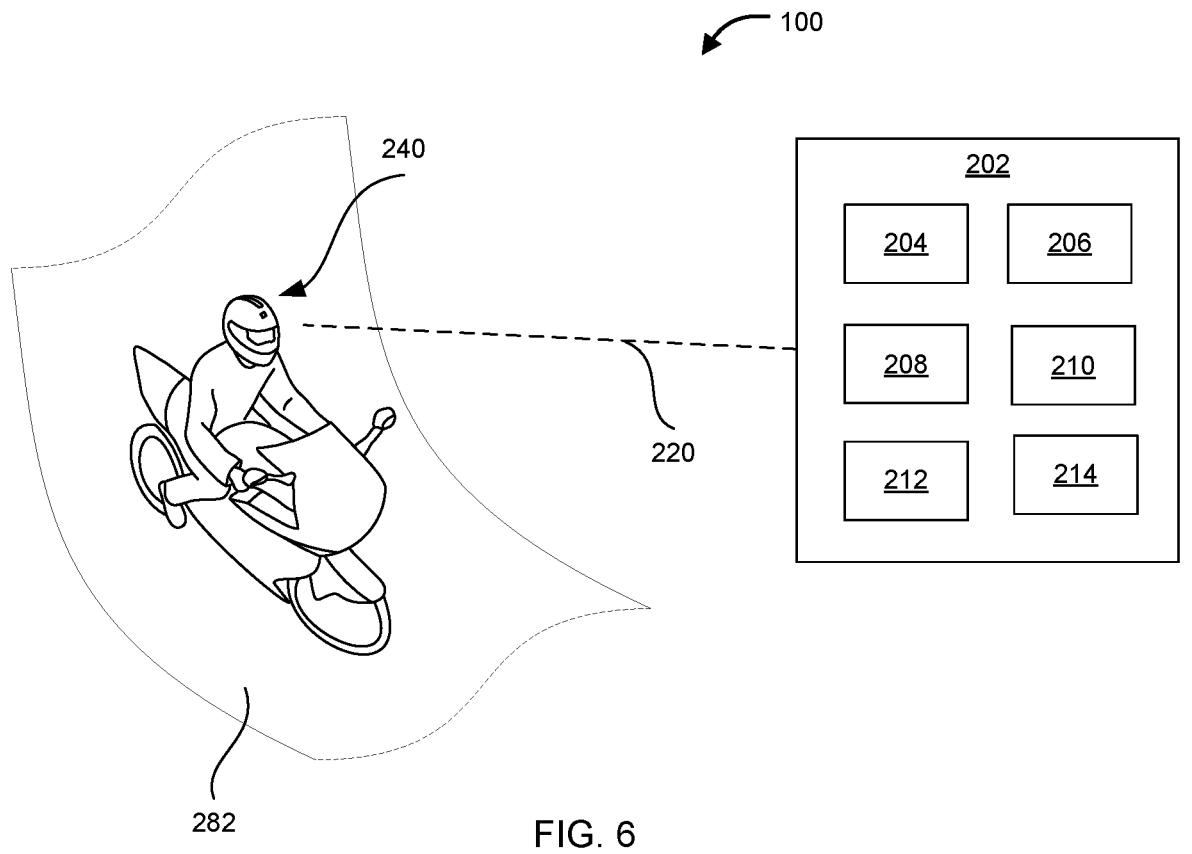
FIG. 6 illustrates a schematic illustration of the system of FIG. 1 as implemented for active threat monitoring in the user worn helmet, in accordance with one or more exemplary embodiments of the present disclosure.

In one embodiment, the controller 204, the user database 206, the environment monitoring unit 210, the awareness unit 212, and the interesting event detection unit 214 are disposed in the server 202, as illustrated in FIG. 6. As shown, a user is wearing the helmet 240. The user is riding a bike on the road 282. The helmet 240 is wirelessly connected with the server 202 via the network 220. The CPU (central processing unit) (similar to the control circuit 242) and GPU (graphics processing unit) is configured for local intelligence/processing on the helmet 240 with further extended processing using the server 202 for the cloud based intelligence (artificial intelligence/neural network). In the present example, the helmet 240 may be configured to learn about the activities of the user over time, to determine the threshold levels for warning the user.

In one or more embodiments, the plurality of physical sensors comprise at least one of a front camera 252, a rear camera 254, side cameras 256, an aerial camera (not shown), a 360° view camera 258, and a radar 260. Further, the helmet 240 uses different sensors such as LIDAR along with the plurality of physical sensors mounted thereon to do a threat mapping.

In one or more embodiments, the virtual data feed at the IoT server 202 is received from IoT devices.

In one or more embodiments, the virtual data feed comprises cloud-based data, wherein the cloud-based data comprises at least one of weather data, historical data, data on amount of light falling on the user's eyes, SOS alert information, environmental data, and data received from other users.

In one or more embodiments, the virtual data feed comprises peer to peer communication data, wherein the peer to peer communication data comprises vehicle to everything (V2X) data received from peer devices.

In one or more embodiments, the controller 242 is further configured to process the threat based on the analysed data and transmits the processed threat data over V2X (vehicle to everything) communication to the peer devices.

In one or more embodiments, the multimodal communication interface 266 is configured to receive multimodal states related to the user for intent detection thereof.

In one or more embodiments, the multimodal communication interface 266 warns the user with directionality and intensity of the warning via multimodal communication In one or more embodiments, the multimodal communication comprises at least one of bone conduction communication, visual and audible communication, augmented reality projection, virtual reality projection, and stationary display.

In one or more embodiments, the device 240 is used by at least one of a biker, a mining worker, a road worker, and a sportsperson.

In another aspect of the present disclosure, the controller 242, the user database 206, the environment monitoring unit 210, the awareness unit 212, and the multimodal communication interface 266 are operationally configured on the user device 280. Herein, the user device 280 may be a mobile phone, a personal digital assistant, a tablet, a laptop, and a computer, as illustrated in FIG. 5. As illustrated in FIG. 5, the user device 280 is wirelessly coupled with the helmet 240 via the wireless communication channel 220. Further, the helmet 240 is wirelessly coupled with the server 202 via the wireless communication channel 220.

The processing logic of the helmet 240 may be shifted to the user device 280. In particular, the processing logic of the helmet 240 could run on the mobile phone 280. The physical sensors data from the helmet 240 is shared to the mobile phone 280 via WiFi or cellular 220 and the processing logic runs on the mobile phone 280 and the results are received back to the helmet 240 to broadcast alert/warning or to take any other precaution.

In one implementation, the rider may use the display of the user device 280, instead of the dedicated display provided on the helmet 240. The user device 280 may provide a visual clue of the intensity on the display thereof.

In one or more implementations, instead of an onboard v2x receiver of the helmet 240, data could come from an external v2x receiver (not shown). The external v2x receiver may be installed on roadside. The external v2x receiver communicates with the helmet 240 for transmitting the v2x data. For example, the helmet will connect to a mobile phone via WiFi or BT or cellular and receive the live sensors data feed from the v2x receiver on the mobile phone.

Figure 9:
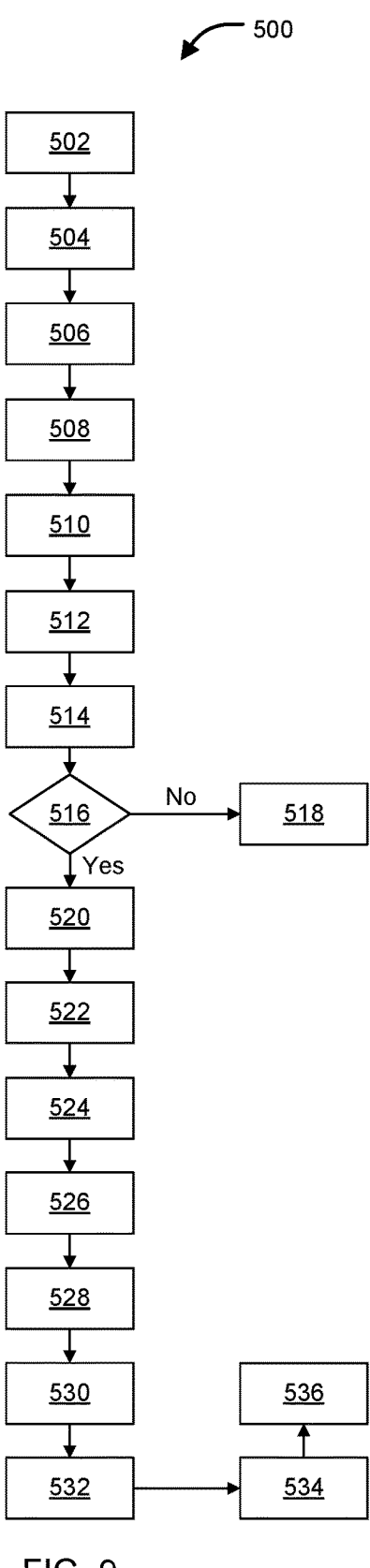
FIG. 9 illustrates a flowchart depicting steps involved in a method for active threat monitoring with the user worn helmet, in accordance with one or more exemplary embodiments of the present disclosure.

Referring now to FIG. 9, illustrated is a flow chart 500 of a process depicting steps involved in active threat monitoring in user worn helmet, in accordance with an embodiment of the present disclosure. At t step 502, all sensor data is sampled at the server. Herein, the sensor data includes the physical sensors data and the virtual data. After sampling the sensor data, at step 504, fusion of sensor data at the server is performed. Thereafter, at step 506, environmental context at the awareness unit is applied. At step 508, the threat based on the data received from the above steps is computed. Thereafter, at step 510, augmented inference with external intelligence (if available) or local intelligence is applied. At step 512, data from peer users (peer devices) is overlayed. At step 514, artificial intelligence/neural network is implemented at the server for determining threshold level for warning the user. Further, artificial intelligence/neural network is implemented at the server for predicting occurrence of the threat.

At step 516, the predicted threat level is compared with the threshold level and checked if the predicted threat level is greater than the threshold level. If not, at step 518, then the predicting occurrence of the threat data to create event statistics (for example, biometric data, stress load, physical exertion) is used. If yes, at step 520, the user or the rider (helmet worn user or rider) is warned. At step 522, the warning may be multisensory and positional warning (directional sensitive). In particular, the multimodal communication interface warns the user with directionality and intensity via at least one of bone conduction communication, visual and audible communication, augmented reality projection, virtual reality projection, and stationary display. At step 524, the feedback received from the user in response to the warning is analysed. At step 526, the analysed feedback data to the IoT server is updated. At step 528, additional threat monitoring on the IoT server is performed. At step 530, the analysed feedback data is used to improve the threat monitoring model. At step 532, if an accident occurs then the alert to all peer devices (IoT devices) over v2x communication is broadcasted. At step 534, SoS or emergency contact of the user is called. At step 536, all the data of vitals and accident scene information which is done by the helmet is transmitted.

The system 100 and the device 240 as described in the embodiments of the present disclosure are allowed for active threat monitoring which monitors threats and provides avoidance warning/alerts to the user. The primary usefulness of the system and device is to detect a threat before it occurs to avoid accidents from occurring. The system 100 works in combination of sensors, that is, physical sensors, synthetic (virtual) sensors (provides virtual data feed), cloud-based data, and peer to peer devices data. The system generally corresponds to the device 240 (that is, helmet 240) that is worn by the user while commuting including traveling, riding, working or doing any sport activity which offers proactive safety warning and importantly driving avoidance solutions to fall, accident, crash or a mishap. In case of such an emergency event, the system warns the user and protects the user by minimizing the impact or the injury. The system also allows an external authorized user to monitor the threat conditions and to take mitigation actions. The system 100 also enables the creation of a digital twin of the user whereby the status of the user is replicated for other appliances to utilize; for example, the rate of fall, distance to others is continuously replicated in the cloud server 202. In one implementation, when the system 100 or the device 240 is used for sport application, the system 100 or the device 240 tracks performance of the user. In another implementation, when the system 100 or the device 240 is used for safety workers, the system or the device tracks alertness, stress, and the like. In another implementation, the device 240 may be used for defence applications. Specifically, the device 240 may be used to enable threat monitoring for soldiers.

The system 100 involves sharing the federated threat modelling data to peer users or peer devices for helping them. In particular, the system 100 involves active sharing of curated threat models over v2x apart from the sensor data sharing, which helps other devices for increasing accuracy.

The system 100 is also configured to be implemented for mapping of the environment which includes figuring out what is where, without any limitations. The system 100 is also configured to be implemented for three-dimensional mapping with location.

The system 100 and the device 240 use sensor fused data, object detection, and AI algorithm (AI based threat detection) to determine if the objects around could pose a threat. As used herein, AI based threat detection is not a fixed algorithm that raises a threat alert, and may include a neural network based algorithm.

The device 240 is designed as a head worn device with integration of advanced sensors including ones that can use audio, visual methods to proactively study the threat vectors around the user. The device 240 could be worn even in a sport activity or by a safety worker, while threat assessment may be performed in the cloud server 202. In addition, the gadget also relies on data and intelligence outside of itself to understand and proactively study the threat vectors in the range outside of the visible range. In short, the device continuously sees through the sensors directly connected and also through a cloud or edge service, the sensors which are in other systems and are sharing data.

When the device 240 is worn by the sports person (for example, a football player), the physical inputs (from cameras) could be the same. Synthetic sensors input could be temperature, heat, previous history of accidents in the zone, etc. Herein, threat patterns scanned around the sports person could be very different from the biker who is riding the bike on the road. For example, when a person is wearing the helmet while playing a game, the system or the device could be always looking for flying objects such as a ball that could crash into him from behind.

The device 240 warns the user by using a multimodal communication method. The device 240 uses bone conduction to communicate warnings with directionality and intensity to the user. For example, if the threat is approaching from the rear left, this position is communicated to the user by effecting electrical signals to the back portion of the left side of the car. In addition, the device provides a visual clue of the intensity by using the colour and brightness of a visor mounted lighting and display system.

The device 240 also actively broadcasts the status of the user such as the location of the user and also the where-abouts such as angle, speed, altitude, etc. This helps the other devices or vehicles understand and get alerts. For example, if someone is doing a skydive, the peer divers get alerts if they come too close. The planes flying get infor-mation about the position of the user. The same also is applicable on the road.

The device 240 actively learns when the threat is miti-gated without danger and learns that this is within the threshold levels that does not require warning the user. For example, a user wearing it when playing soccer, learns that it is common for other players from opponent teams to come so close while it is still not considered a threat. While in such a scenario, it warns when the player is running backwards and could run into another player.

The device 240 also uses electrical signals around the head to understand the response of the user to threat to learn more about what matters and what is important in different contexts.

The present disclosure provides an increase in safety for users while performing activities that involve risks. This is made possible by performing active threat management or active threat monitoring on behalf of the user thereby becoming his extended sense. The present disclosure also fosters creating an overall safe environment by enabling sharing of critical parameters of the user such as location, approach vector, speed, etc. to devices (peer devices) around. The present disclosure enables proactive remote threat management to be provided as a service to the user. The present disclosure also enables faster reaction time for helpline in case an emergency occurs by using features like digital twin.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodi-ments with various modifications as are suited to the par-ticular use contemplated.

What is claimed is:

1. A threat monitoring system, comprising:
a controller;
an Internet of Things (IoT) cloud server comprising an IoT database, the IoT cloud server being configured to aggregate data in real time from a plurality of IoT devices, perform sensor fusion and data correlation across said devices, and generate context-aware virtual data feeds for use in threat prediction and comprehen-sive environmental mapping;
a head mounted wearable device comprising:
a plurality of physical sensors configured to sense and generate at least one of visual feed and radar feed, and
a multimodal communication interface;
a user database configured to store user profile data;

an environment monitoring unit comprising a processor and a memory, the environment monitoring unit being configured to receive and integrate data from the visual feed, the radar feed, and the virtual data feed, and to generate a real-time, multi-dimensional map of the environment by performing sensor fusion and data correlation across said feeds; and
an awareness unit comprising a processor and a memory, the awareness unit being configured to determine an environmental context by analyzing the position of a user in relation to the mapped environment and the virtual data feed, and to identify context-specific threat indicators,
wherein the controller is configured to:
receive the user profile data from the user database, the visual feed and the radar feed from the plurality of physical sensors, the mapped environment from the environment monitoring unit, the environment con-text from the awareness unit, and the virtual data feed from the IoT database;
analyse the user profile data, the visual feed and the radar feed, the environment context, and the virtual data feed to predict occurrence of threat; and
generate and deliver a warning to the user about a threat, wherein the warning comprises directional and intensity cues corresponding to the location and severity of the predicted threat, and is communicated via the multimodal communication interface using at least one of audio, visual, and haptic modalities, the warning being adaptively tailored based on the user's environmental context and profile data.

2. The system as claimed in claim 1, wherein the con-troller, the user database, the environment monitoring unit, and the awareness unit are disposed in the head mounted wearable device.

3. The system as claimed in claim 1, wherein the con-troller, the user database, the environment monitoring unit, the awareness unit, and the multimodal communication interface are operationally configured in a user device.

4. The system as claimed in claim 1, wherein the plurality of physical sensors comprises at least one of a front camera, a rear camera, side cameras, an aerial camera, a 360° view camera, and a radar.

5. The system as claimed in claim 4, wherein the front camera is mounted in the head mounted wearable device facing towards the user for monitoring awareness, attention, and glanced based information of the user.

6. The system as claimed in claim 4, wherein the 360° view camera is configured to capture images for performing depth detection and for sending the captured images to the IoT cloud server.

7. The system as claimed in claim 1, wherein the virtual data feed at the IoT server is received from IoT devices.

8. The system as claimed in claim 1, wherein the virtual data feed comprises cloud-based data, wherein the cloud-based data comprises at least one of weather data, historical data, data on amount of light falling on the user's eyes, SOS alert information, environmental data, and data received from other users.

9. The system as claimed in claim 1, wherein the virtual data feed comprises peer to peer communication data, wherein the peer to peer communication data comprises vehicle to everything (V2X) data received from peer devices.

10. The system as claimed in claim 9, wherein the controller is further configured to process the threat based on the analysed data and transmits the processed threat data over V2X (vehicle to everything) communication to the peer devices.

11. The system as claimed in claim 1, wherein the multimodal communication interface is configured to receive multimodal states related to the user for intent detection thereof.

12. The system as claimed in claim 11, wherein the multimodal states comprise at least one of user's speech, gesture, touch, brainwave, gaze, pupil movement, head movement and body movement.

13. The system as claimed in claim 11, wherein the multimodal communication interface warns the user with directionality and intensity of the warning via multimodal communication.

14. The system as claimed in claim 11, wherein the multimodal communication comprises at least one of bone conduction communication, visual and audible communication, augmented reality projection, virtual reality projection, and stationary display.

15. The system as claimed in claim 1, wherein the controller is further configured to determine a threshold level for warning the user, wherein the user is warned if the predicted occurrence of the threat is greater than the determined threshold level.

16. A head mounted wearable device for threat monitoring in communication with an Internet of Things (IoT) cloud server having an IoT database, wherein the IoT database is configured to generate virtual data feed, the head mounted wearable device comprising:

a plurality of physical sensors configured to sense and generate at least one of visual feed and radar feed;

a user database configured to store user profile data;

an environment monitoring unit comprising a processor and a memory, the environment monitoring unit being configured to receive and integrate data from the visual feed, the radar feed, and the virtual data feed, and to generate a real-time, multi-dimensional map of the environment by performing sensor fusion and data correlation across said feeds;

an awareness unit comprising a processor and a memory, the awareness unit being configured to determine an environmental context by analyzing the position of a user in relation to the mapped environment and the virtual data feed, and to identify context-specific threat indicators;

a multimodal communication interface; and a controller configured to:

receive the user profile data from the user database, the visual feed and the radar feed from the plurality of physical sensors, the mapped environment from the environment monitoring unit, the environment context from the awareness unit, and the virtual data feed from the IoT database;

analyse the user profile data, the visual feed and the radar feed, the environment context, and the virtual data feed to predict occurrence of threat; and generate and deliver a warning to the user about a threat, wherein the warning comprises directional and intensity cues corresponding to the location and severity of the predicted threat, and is communicated via the multimodal communication interface using at least one of audio, visual, and haptic modalities, the warning being adaptively tailored based on the user's environmental context and profile data.

17. The device as claimed in claim 16, wherein the plurality of physical sensors comprises at least one of a front camera, a rear camera, side cameras, an aerial camera, a 360° view camera, and a radar.

18. The device as claimed in claim 16, wherein the virtual data feed at the IoT server is received from IoT devices.

19. The device as claimed in claim 16, wherein the virtual data feed comprises cloud-based data, wherein the cloud-based data comprises at least one of weather data, historical data, data on amount of light falling on the user's eyes, SOS alert information, environmental data, and data received from other users.

20. The device as claimed in claim 16, wherein the virtual data feed comprises peer to peer communication data, wherein the peer to peer communication data comprises vehicle to everything (V2X) data received from peer devices.

21. The device as claimed in claim 20, wherein the controller is further configured to process the threat based on the analysed data and transmits the processed threat data over V2X (vehicle to everything) communication to the peer devices.

22. The device as claimed in claim 16, wherein the multimodal communication interface is configured to receive multimodal states related to the user for intent detection thereof.

23. The device as claimed in claim 22, wherein the multimodal communication interface warns the user with directionality and intensity of the warning via multimodal communication.

24. The device as claimed in claim 22, wherein the multimodal communication comprises at least one of bone conduction communication, visual and audible communication, augmented reality projection, virtual reality projection, and stationary display.

25. The device as claimed in claim 16, wherein the device is used by at least one of a biker, a mining worker, a road worker, and a sportsperson.

* * * * *